United States Patent [19]
Katakura et al.

[11] Patent Number: 6,108,017
[45] Date of Patent: Aug. 22, 2000

[54] PRINTER

[75] Inventors: Shinichi Katakura; Masato Nagata; Takao Uchida, all of Tokyo, Japan

[73] Assignee: Oki Data Corporation, Tokyo, Japan

[21] Appl. No.: 09/286,633

[22] Filed: Apr. 5, 1999

[30] Foreign Application Priority Data

| Apr. 8, 1998 | [JP] | Japan | 10-096178 |
| Dec. 7, 1998 | [JP] | Japan | 10-346286 |

[51] Int. Cl.[7] ............. B41J 2/385; G01D 15/06; G03G 15/01
[52] U.S. Cl. .................... 347/115; 358/401
[58] Field of Search ................ 347/115, 116, 347/117, 112, 43; 358/401, 501

[56] References Cited

U.S. PATENT DOCUMENTS

| 4,893,179 | 1/1990 | Ito ................... 347/115 X |
| 4,905,091 | 2/1990 | Suzuki et al. . |
| 5,003,494 | 3/1991 | Ng . |
| 5,175,632 | 12/1992 | Hayashi et al. .......... 358/401 |
| 5,627,653 | 5/1997 | Nakazato ................ 358/401 X |
| 5,646,749 | 7/1997 | Omi et al. ............... 358/501 X |

*Primary Examiner*—Sandra Brase
*Attorney, Agent, or Firm*—Akin, Gump, Strauss, Hauer & Feld, L.L.P.

[57] ABSTRACT

A color image recording apparatus operates in a color print mode and in a monochrome printing mode. A set of color print heads are driven in accordance with corresponding color image data. A monochrome print head is driven in accordance with black image data. A controller transmits in parallel or in serial the color image data and the black image data to the corresponding print heads in a color printing mode. The controller transmits the black image data faster in the monochrome printing mode than in the color printing mode, thereby increasing printing speed. The controller may include signal processing circuits such as compressing circuits and expanding circuit for the respective color image data and black image data. In the monochrome printing mode, the controller divides the black image data into a plurality of segments and supplies the segments in parallel to the signal processing circuits. The signal processing circuits process the segments and supply the processed data to the monochrome print head in a predetermined sequence, thereby increasing printing speed.

13 Claims, 33 Drawing Sheets

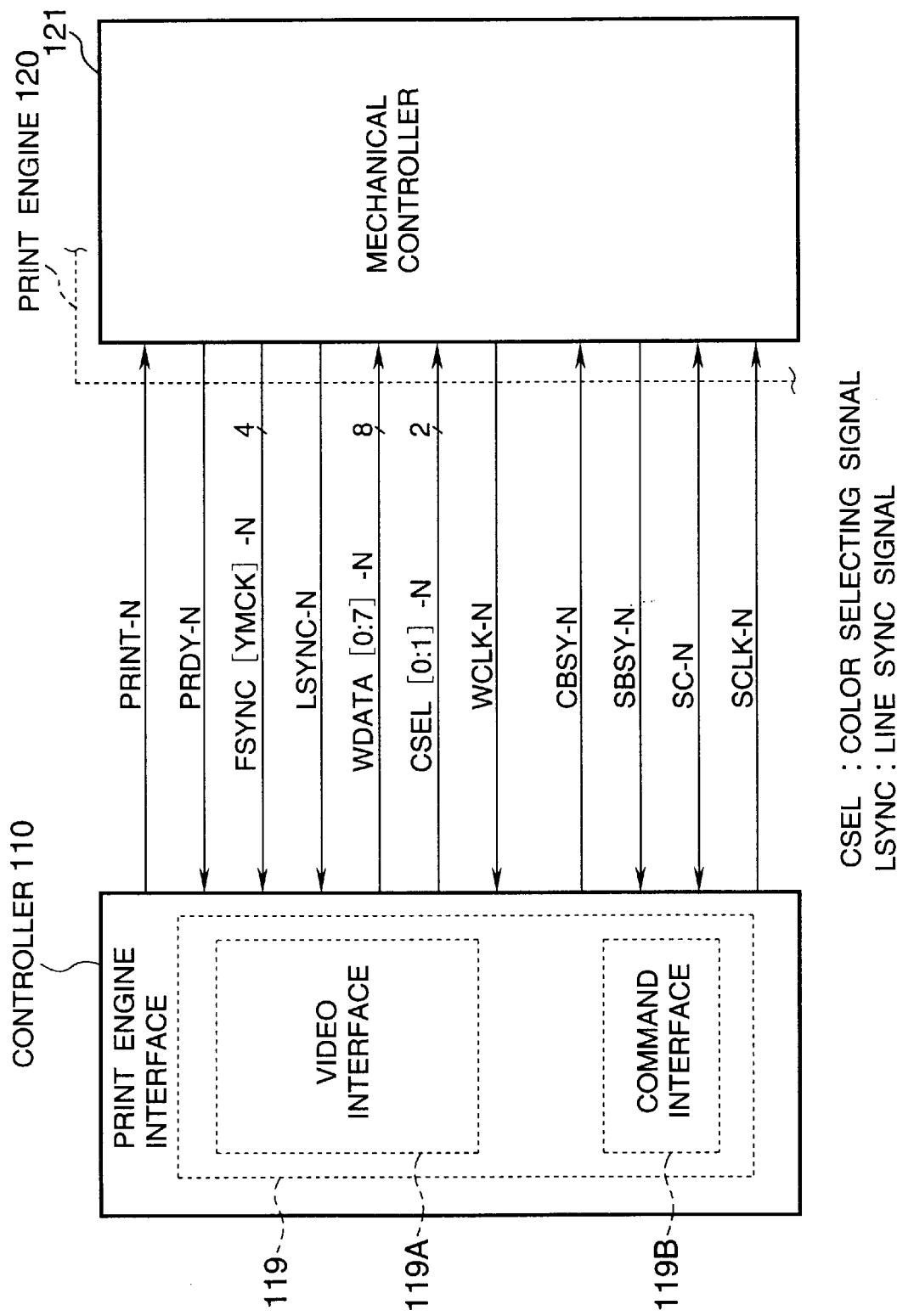

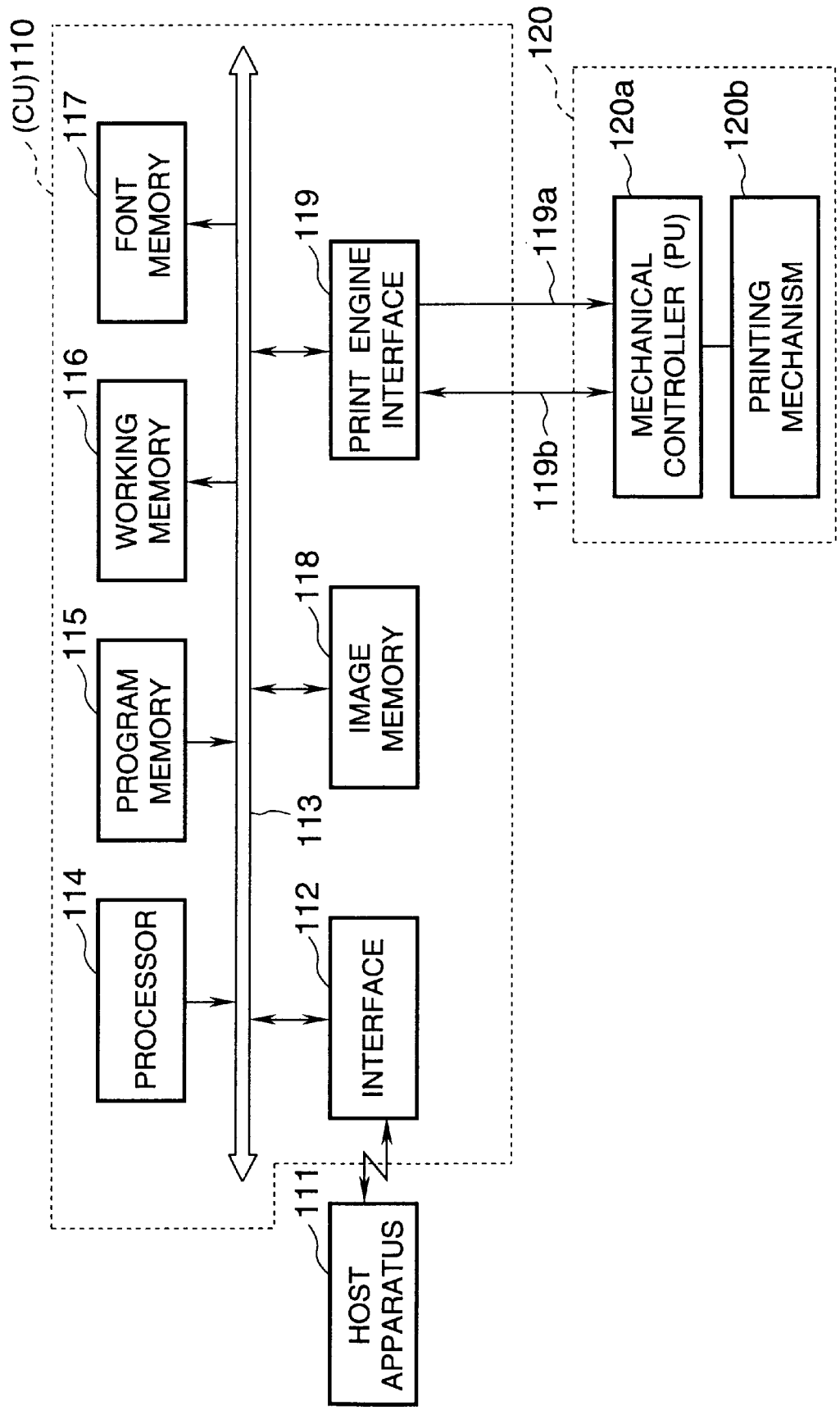

(a) PRINT-N
(b) PRDY-N (c) FSYNC-N
(d) FSYNC-N
(e) LSYNC-N
(f) WDATA
(g) WCLK (h) LSYNC-N
(i) LGATE-N
(j) WDATA
(k) WCLK
(l) WDATA

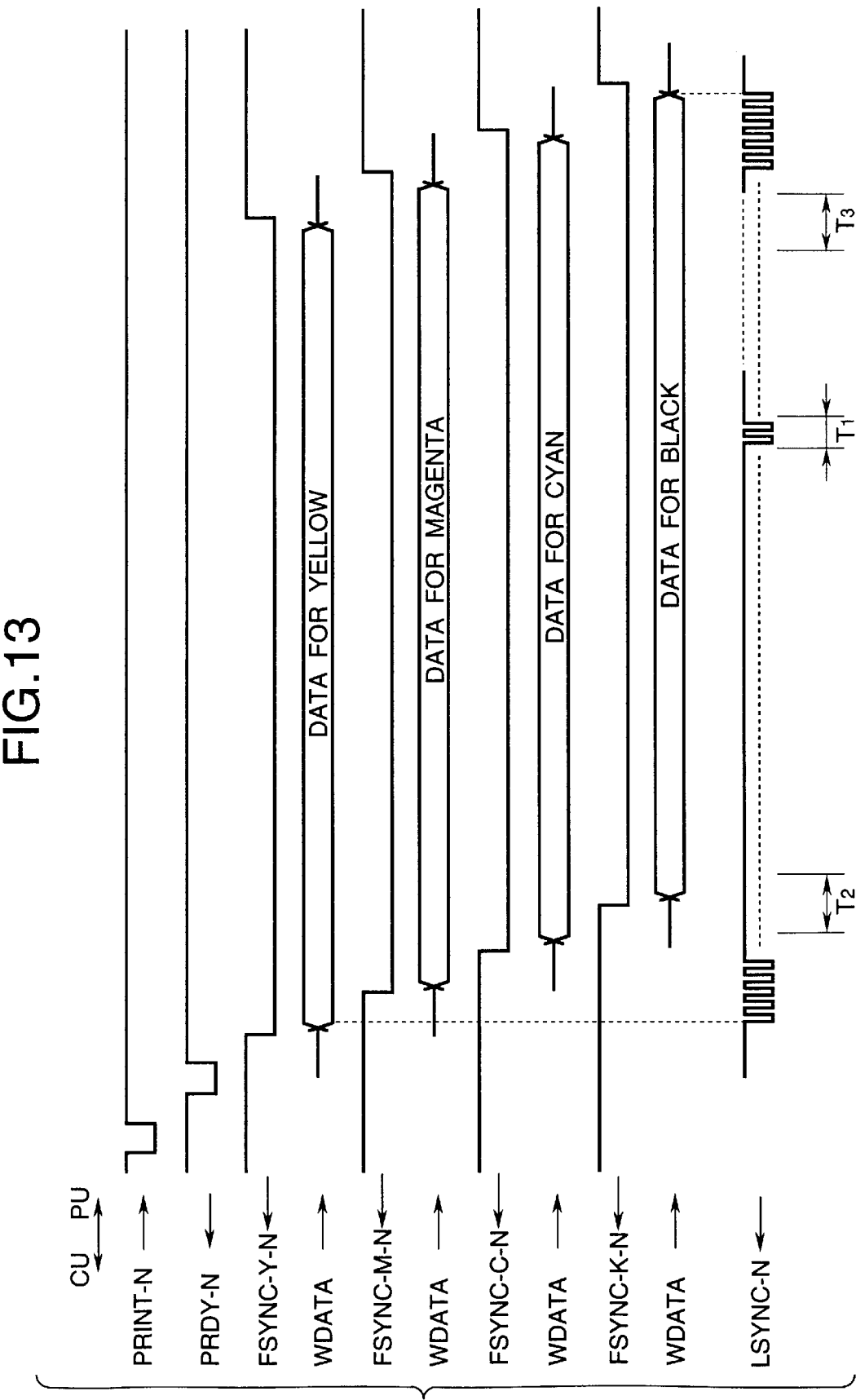

(a) LSYNC-N
(b) WDATA
(c) CSEL 1
(d) CSEL 2

(e) LSYNC-N
(f) WDATA
(g) CSEL 1
(h) CSEL 2

| NO. | R | G | B |
|---|---|---|---|
| 1 | 00 | 00 | 00 |
| 2 | FF | FF | FF |
| 3 | FF | 00 | 00 |
| 4 | 00 | FF | 00 |
| 5 | 00 | 00 | FF |

| Y | M | C | K |
|---|---|---|---|
| 00 | 00 | 00 | FF (BLACK) |
| 00 | 00 | 00 | 00 (WHITE) |
| FF | FF | 00 | 00 |
| FF | 00 | FF | 00 |
| 00 | FF | FF | 00 |

PRINTER

BACKGROUND OF THE INVENTION

The present invention relates to a printer which is capable of performing a multi-color printing and a monochrome printing. The present invention also relate to a color image recording apparatus where image forming section are aligned in tandem and images of different colors are recorded in registration with one another on a print medium to form a color image.

Various documents are produced using computers, word processors, and other business machines and the documents are printed by printers connected thereto. Such printers include electrophotographic printer, thermal printer, wire-dot printer, and ink jet printer. These printers receive print data from their host apparatuses, and store the print data therein, reform the print data, and provide the reformed print data at predetermined timings to print engines. With color printers, the print data is edited according to color such as yellow, magenta, cyan, and black.

Color printers are often required to print documents whose print data is mostly characters in the form of a black-and-white image. Thus, many color image-recording apparatuses have a black-and-white printing function as well as a color printing function.

The aforementioned conventional art suffers from the following drawbacks.

Print data includes four items of data for four colors and the respective items of data are subjected to compression and expansion before being fed to print engines. For this purpose, color printers are capable of processing about four times as large an amount of data as monochrome printers.

Thus, when the conventional color printer prints black-and-white images, only a part of its high data-processing capability is used. This is not economical. One solution to increased printing speed in the monochrome printing may be to transferring the data at a speed four times as high as in the color printing. However, increasing data transfer speed by a factor of four needs a higher system clock frequency. Higher clock frequencies impose a noise problem.

A conventional color image recording apparatus has image forming sections for yellow, magenta, cyan, and black images. A print medium is fed one page at a time from a paper cassette. A carrier belt attracts the print medium with the aid of Coulomb force and transports the print medium from section to section. Each image forming section has a corresponding recording head with recording elements aligned in line in a traverse direction perpendicular to an advance direction in which the print medium is transported. As the print medium passes the image forming sections, the print heads record images of corresponding colors on the print medium on a line-by-line basis.

The image forming section for black image is usually located most downstream of the transport path of the print medium. In the monochrome printing, the print medium is transported through the yellow, magenta, cyan image forming sections to the black image forming section.

Accordingly, the print medium is transported in the monochrome printing at the same speed as in the color printing even though only the black image forming section operates to print images. This is inefficient.

SUMMARY OF THE INVENTION

The present invention was made in view of the aforementioned drawbacks of the prior art image forming apparatus.

A color image recording apparatus includes a set of color print heads, monochrome print head, and controller. The set of color print heads are driven in accordance with corresponding color image data. The monochrome print head is driven in accordance with black image data. The controller transmits the color image data to corresponding color print heads and the black image data to the monochrome print head. The controller transmits in parallel or in serial the color image data and the black image data to the corresponding print heads in a color printing mode. The controller transmits the color image data and black image data at a first transfer speed in the color printing mode and the black image data at a second transfer speed in the monochrome printing mode.

The controller may include signal processing circuits such as compressing circuits and expanding circuit that processes the color image data and black image data before transmitting the color image data and black image data to the corresponding color print heads and the monochrome print head. In a color printing mode, the signal processing circuits process the color image data and black image data and then transmit processed color image data and black image data to the corresponding print heads. In a monochrome printing mode, the controller divides the black image data into a plurality of segments and supplies the segments in parallel to the signal processing circuits. The signal processing circuits process the segments and supply the processed data to the monochrome print head in a predetermined sequence.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

The present invention will become more fully understood from the detailed description given hereinbelow and the accompanying drawings which are given by way of illustration only, and thus are not limitative of the present invention, and wherein:

FIG. 10 illustrates an interface between the controller 10 and the print engine 20 of the image recording apparatus 1;

FIG. 11 is a block diagram showing an overall construction of the image recording apparatus 1;

FIG. 13 is a timing chart illustrating the operation of the video interface 9A;

DETAILED DESCRIPTION OF THE INVENTION

The preferred embodiments of the invention will be described with reference to the accompanying drawings.

First Embodiment

<General Construction of Recording Apparatus>

Figure 1:
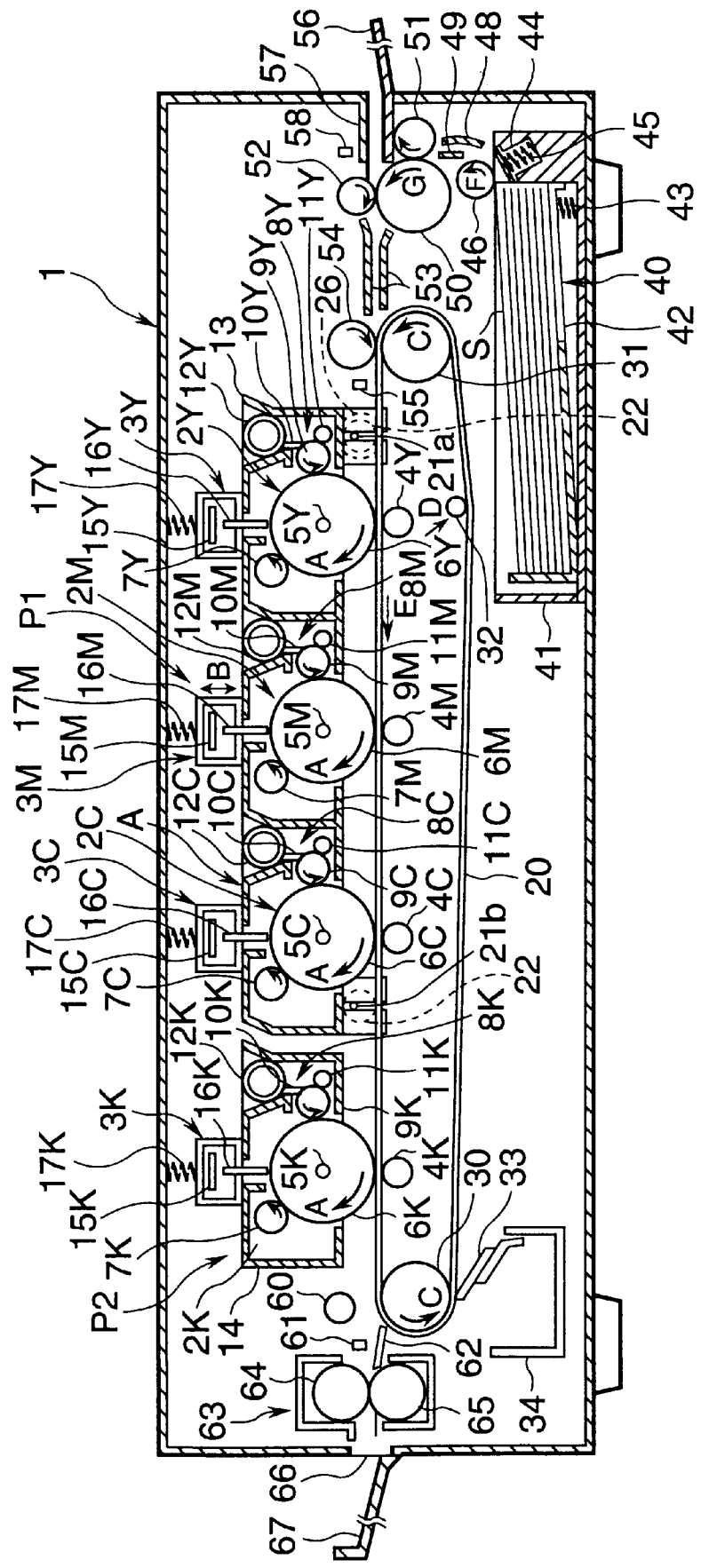
FIG. 1 illustrates a color image recording apparatus 1 according to a first embodiment.

FIG. 1 illustrates a color image recording apparatus 1 according to the present invention.

Figure 2:
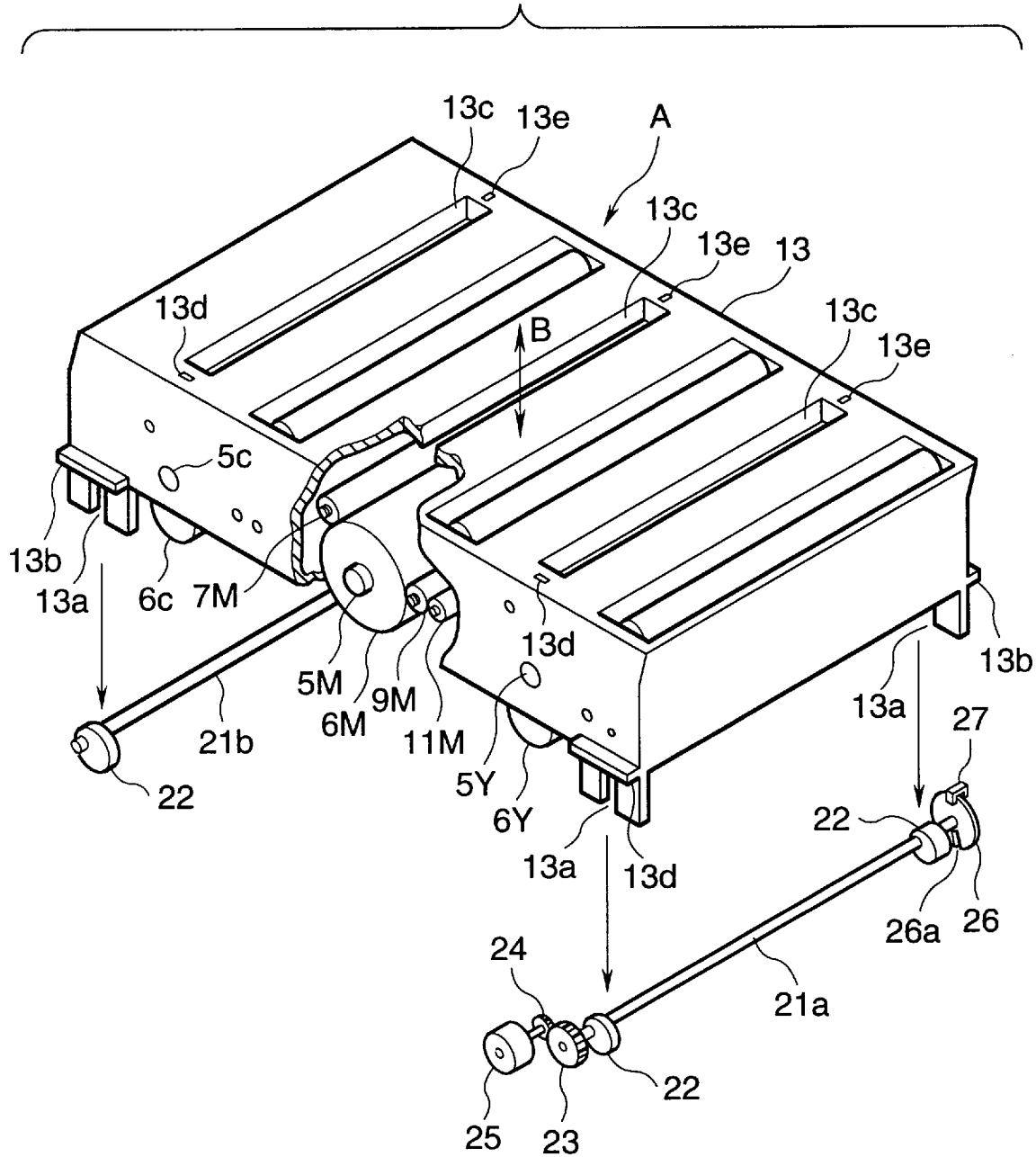
FIG. 2 is a perspective view of a color image forming section of FIG. 1.

FIG. 2 is a perspective view of a color image forming section of FIG. 1.

Referring to FIG. 1, there are provided two printing mechanisms P1 and P2 in the form of an electrophotographic LED printing mechanism. The printing mechanism P1 and P2 are aligned from a medium insertion side to a medium discharging side. The first printing mechanism P1 is for yellow, magenta, and cyan images and the second printing mechanism P2 is for black images. The first printing mechanism P1 includes a color image forming unit A, which is constructed of image forming sections 2Y, 2M, and 2C, photoconductive drum 6Y, 6M, and 6C, charging rollers 7Y, 7M, and 7C, LED heads 3Y, 3M, and 3C, and developing sections 8Y, 8M, and 8C. These structural elements are supported on a frame 13. The photoconductive drums 6Y, 6M, and 6C rotate about their rotational shafts 5Y, 5M, and 5C. The charging rollers 7Y, 7M, and 7C rotate in contact with the corresponding photoconductive drums and charges the photoconductive drums. The LED heads illuminate the corresponding photoconductive drums to form electrostatic latent images in accordance with the image data. The developing sections 8Y, 8M, and 8C develop the electrostatic latent images into toner images, which in turn are transferred to a print medium.

The developing sections 8Y, 8M, and 8C include developing rollers 9Y, 9M, and 9C, developing blades 10Y, 10M, and 10C, sponge rollers 11Y, 11M, and 11C, and toner tanks 12Y, 12M, and 12C.

The second printing mechanism P2 has a black image forming section 2K. The black image forming section 2K includes a photoconductive drum 6K, charging roller 7K, LED head 3K, developing section 8K, and transfer roller 4K. The developing section 8K includes a developing roller 9K, developing blade 10K, sponge roller 11K, and toner tank 12K. The structural elements are supported on a frame 14 and operate the same way as those in the first printing mechanism P1.

The image forming sections 2Y, 2M, 2C, and 2K are of the same construction and therefore the image forming section 2Y will be described by way of example.

Non-magnetic, one component toner supplied from the toner tank 12Y is directed via the sponge roller 11Y to the developing blade 10Y, which forms a thin layer of toner to the developing roller 9Y formed of a semiconductive rubber material. The toner is then brought into contact with the surface of the photoconductive drum 6Y as the photoconductive drum and the developing roller 9Y rotate. The toner undergoes friction between the developing roller 9Y and developing blade 10Y so that the toner is triboelectrically charged. In the present invention, the tone is negatively charged. The sponge roller 11Y supplies an appropriate amount of toner to the developing blade 10Y. When the toner has been exhausted, the toner tank 12Y is replaced for new, unused toner.

The LED head 3Y includes a selfoc lens array 16Y and a circuit board 15Y on which an LED array and drive ICs for driving the LED array are mounted. The LED array are driven in accordance with the image data received through a later described interface, thereby illuminating the negatively charged surface of the photoconductive drum 6Y to form an electrostatic latent image. The developing roller 9Y applies toner to the electrostatic latent image to from a toner image. The LED head 3Y is urged downwardly by a spring 17Y in FIG. 1. Movably mounted between the photoconductive drum 6Y and transfer roller 4Y is a later described carrier belt 20.

The developing unit 8Y, 8M, and 8C hold yellow, magenta, and cyan toners therein. The developing unit 8K holds black toner therein. The color image signal is separated into yellow, magenta, cyan, and black image signals, which are received by LED heads 3Y, 3M, 3C, and 3K, respectively.

Referring to FIGS. 1–2, there are two cam shafts 21a and 21b, rotatably supported on the frame 13 of the color image-forming unit A. The cam shafts 21a and 21b have eccentric cams 32 attached to opposite longitudinal ends thereof. The frame 13 is formed with cutouts 13a at four lower ends thereof in which the cam shafts 21a and 21b are rotatably received.

The frame 13 is urged downward by the LED heads 3Y, 3M, and 3C, which are urged by springs 17Y, 17M, and 17C, respectively. When the cam shafts 21a and 21b are rotated, the eccentric cams 22 abut and push the frame 13 upward in a direction shown by arrow B, causing the frame 13 to move upward. The cam shaft 21a has a gear 23 firmly attached to one end thereof. The gear 23 is in mesh with a motor gear 24, which in turn is securely connected to the rotational shaft of a cam motor 25. The cam shaft 21b is coupled to the cam shaft 21a through gears and belts, not shown, so that they rotate through the same angle in the same direction. The cam shaft 21a has a disc 26 attached to one end thereof. The disc 26 is formed with a slit 26a therein which is detected by a photosensor 27 as the cam shaft 21a rotates, thereby detecting the rotational position of the eccentric cam 22.

Referring to FIG. 2, the frame 13 is formed with windows 13c and guide pin holes 13d and 13e. The corresponding LED heads 3Y, 3M, and 3C are received in the windows 13c and positioned by the pin holes 13d and 13e with respect to corresponding photoconductive drums 6Y, 6M, and 6C.

Referring to FIG. 1, the carrier belt 20 is formed of a film of a high resistance semiconductive plastics material. The belt 20 is of an endless type and is mounted about a drive roller 30, driven roller 31, and tension roller 32. The resistance of the carrier belt 20 is in a range such that the carrier belt 20 sufficiently attracts the print medium S by Coulomb force and the residual static electricity stored on the carrier belt 20 is neutralized after the print medium S has been released from the carrier belt 20. The drive roller 30 is coupled to a motor, not shown, which drives the drive roller 30 in rotation in a direction shown by arrow C. The tension roller 32 is urged by a spring, not shown, in a direction shown by arrow D so as to apply a proper tension to the carrier belt 20. The upper half of the carrier belt 20 runs in contact with the photoconductive drums 6Y, 6M, 6C, and 6K and transfer rollers 4Y, 4M, 4C, and 4K of the printing mechanism P1 and P2.

The carrier belt 20 is sandwiched between the drive roller 30 and a cleaning blade 33. The cleaning blade 33 is formed of a flexible rubber material or plastics. The cleaning blade 33 is positioned with a tip thereof pressed against the carrier belt 20. When the carrier belt 20 runs, the cleaning blade 33 scrapes the residual toner deposited on the carrier belt 20 into a toner tank 34.

A paper feeding mechanism 40 is disposed on the lower right-hand side of the color image recording apparatus 1. The paper feeding mechanism 40 includes a paper cassette, paper feeding mechanism, and registry rollers 45. The paper cassette includes a recording medium tray 41, push-up plate 42, and push-up means. The paper feeding mechanism includes a separator 44, spring 45, and paper pick-up roller 46. The spring 45 urges the paper separator 44 against the paper pick-up roller 46 so that the paper separator 44 is in pressure contact with the paper pick-up roller 46.

The spring 45 pushes up the recording medium S in the recording medium tray 41 so that the leading end of recording medium S is in pressure contact with the paper pick-up roller 46. When the paper pick-up roller 46 rotates in a direction shown by arrow F, the separator 44 separates the top page of the recording medium S from the rest so as to feed the recording medium S one page at a time from the recording medium tray 41. Each page is guided between guides and 49 and pulled in between the transport roller 50 and a first registry roller 51 and then between the transport roller 50 and a second registry roller 52. The transport roller 50 and second registry roller 52 feed the recording medium S to the attraction roller 54.

The attraction roller 54 is urged against the driven roller 31 with the carrier belt 20 sandwiched therebetween so as to charge and attract the recording medium S delivered from the paper feeding mechanism. For this purpose, the attraction roller 47 is made of a semiconductive rubber material having a high electrical resistance. Provided between the first printing mechanism P1 and the attraction roller 54 is a photosensor 55 that detects the leading end of the recording medium S.

The recording apparatus also has a manual insertion tray 56 and a guide 57 through which the user manually feeds the recording medium S. The manually inserted recording medium S is detected by a sensor 58 and is pulled in between the second registry roller 52 and the transport roller 50.

A neutralizing unit 60 is disposed over the carrier belt 20 near the drive roller 30. The neutralizing unit neutralizes the charges on the recording medium S transported by the carrier belt 20 after transferring a toner image, so that the recording medium 21 is separated smoothly from the carrier belt 20. A photosensor 61 is disposed downstream of the neutralizing unit 60 with respect to the transport path of the recording medium 21 and detects the trailing end of the recording medium 21.

A guide 62 and a fixing unit 63 are disposed downstream of the neutralizing unit 60. The fixing unit 63 fixes the toner image of the respective colors, which have been transferred onto the recording medium S. The fixing unit 48 includes a heat roller 64 for heating the toners on the recording medium 21, and a pressure roller 65 for pressing the recording medium S against the heat roller 64. A paper exit 66 is located downstream of the fixing unit 63 and a paper stacker 67 is disposed outside of the paper exit 66. The printed recording medium S is discharged to the paper stacker 67 through the paper exit 66.

Figure 3:
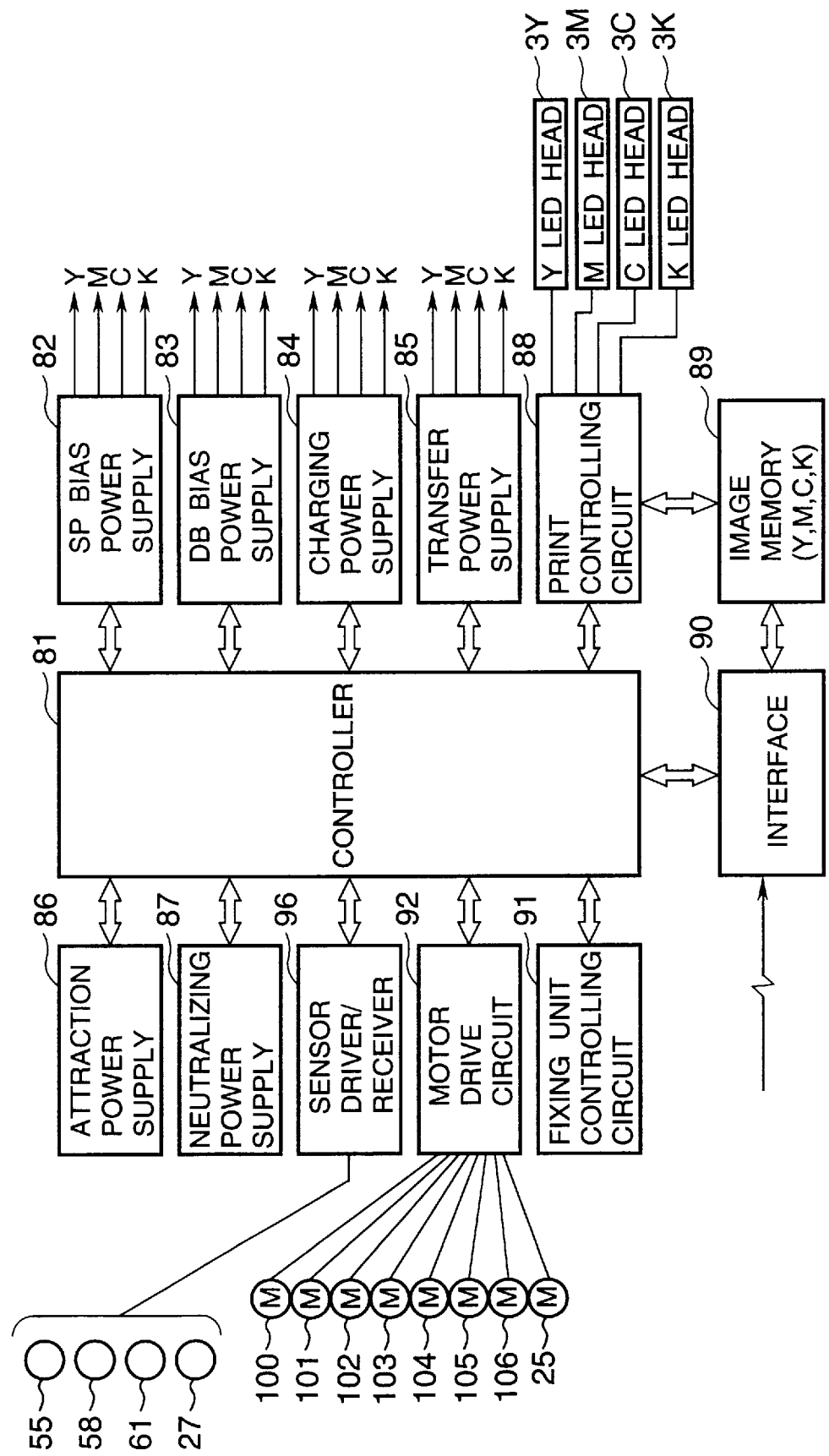
FIG. 3 is a block diagram illustrating a controller of the first embodiment.

FIG. 3 is a block diagram illustrating a controller of the first embodiment. References Y, M, C, and K represents yellow, magenta, cyan, and black image forming sections. The controller 81 takes the form of, for example, a microprocessor, and controls the overall operation of the color image recording apparatus 1. The controller 81 is connected to an SP bias power supply 82 that supplies power to the sponge rollers 11 of the respective developing units, a DB bias power supply 83 that supplies power to the developing rollers, a charging power supply 84 that supplies power to the charging rollers 7, and a transfer power supply 85 that supplies power to the respective transfer rollers 4.

The controller 81 is also connected to a charging power supply 86 that supplies power to the attraction roller 54, and a neutralizing power supply 87 that supplies high voltage power to the neutralizing unit 60. The driven roller 31 is grounded so that a potential difference between the attraction roller 54 and the driven roller 31 creates a Coulomb force that attracts the recording medium to the carrier belt 20. The controller 81 controls the aforementioned power supplies to turn on and off.

The controller 81 is also connected to a print controlling circuit 88, which controls the respective image forming sections. The print controlling circuit 88 receives the image data from the image memory 89 and sends the image data of the respective colors to the LED heads 3Y, 3M, 3C, and 3K, respectively, which in turn illuminate the surfaces of corresponding photoconductive drums to form electrostatic latent images of the respective colors.

The interface 90 receives image data from an external device, for example, host computer, and separates the received image data into yellow, magenta, and cyan image data. These items of data are stored in a corresponding storage area of the image memory 89.

A fixing unit controlling circuit 91 controllably drives a heater, not shown, in a heat roller 64 so as to maintain a constant temperature of the heat roller 64 of the fixing unit 63.

A motor drive circuit 92 is connected to motors 100–106 and cam motor 25, and controls these motors. The motors 100–103 drives in rotation the rotating components of the image forming sections 2Y, 2M, 2C, and 2K and transfer rollers 4Y, 4M, 4C, and 4K. The motor 105 drives the carrier belt 20 in rotation. The motor 104 drives the pick-up roller 46 and transport roller 50 in rotation. The motor 106 drives the fixing unit 63. The cam motor 25 drives the cam shafts 21a and 21b in order to bring the photoconductive drums of the color image forming sections into and out of contact with the carrier belt 20. The sensor receiver/driver 96 drives the photosensors 55, 58, 61, and 27 and receives output waveforms therefrom and sends them to the controller 81.

Figure 4:
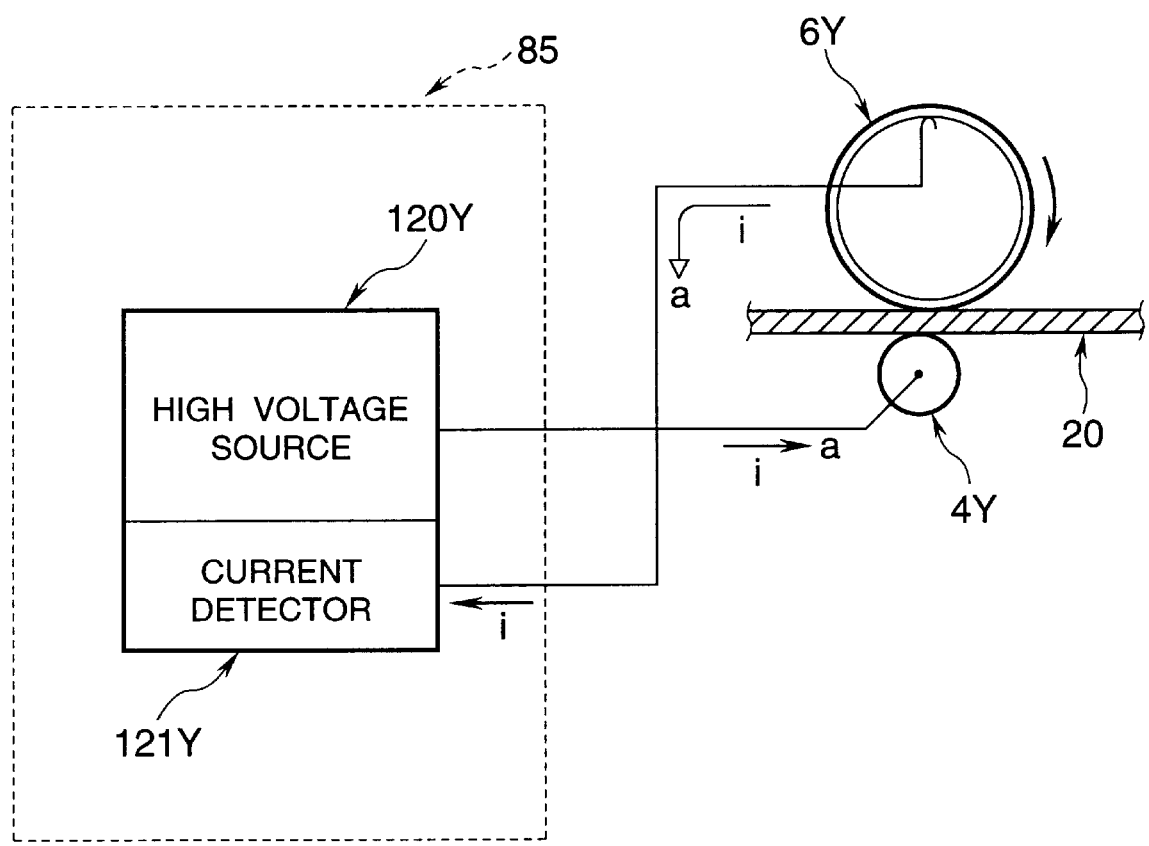
FIG. 4 is an equivalent electrical circuit of the transfer power supply 85 for the yellow image forming section.

FIG. 4 is an equivalent electrical circuit of the transfer power supply 85 for the yellow image forming section. The transfer power supply 85 is provided with a high voltage source 20Y and a transfer current detector 121Y that detects a current flowing through the transfer roller and photoconductive drum. There are also provided high voltage sources and transfer current detectors, not shown, for magenta, cyan, and black image forming sections.

<General Operation>

The operation of the aforementioned color image recording apparatus 1 according to the first embodiment will now be described.

Figure 5:
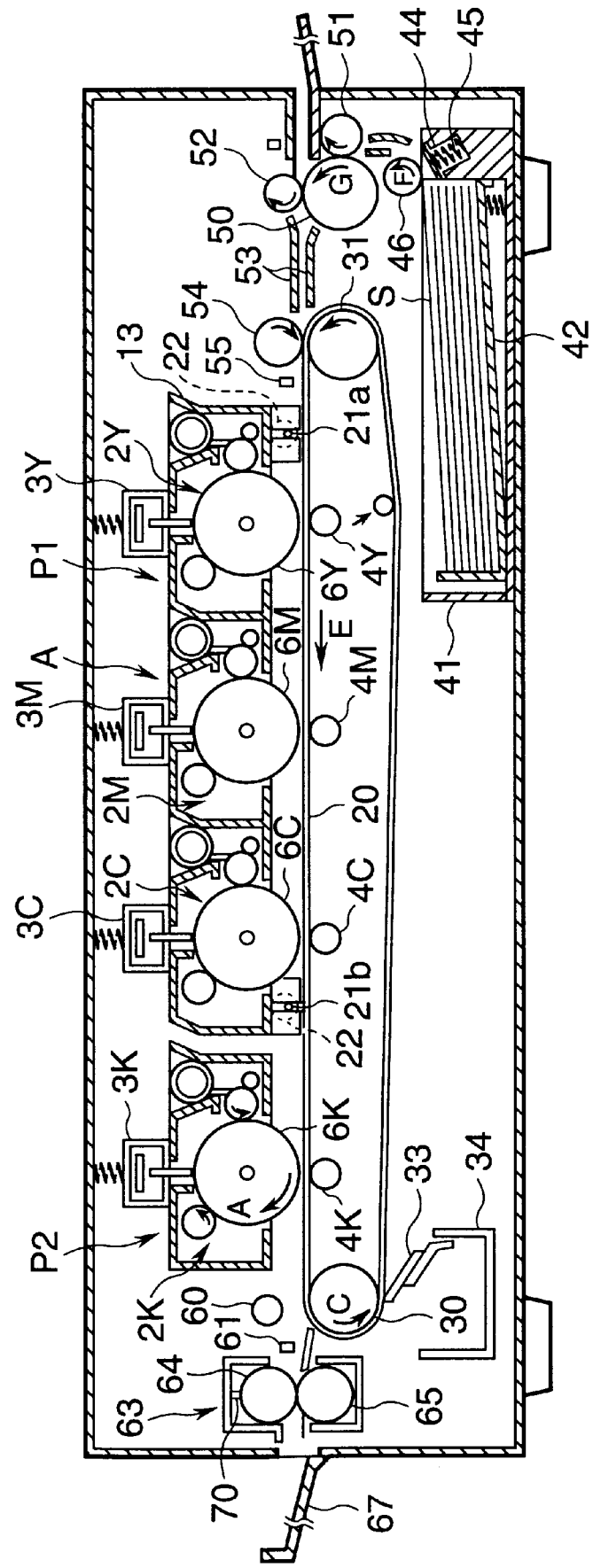
FIG. 5 illustrates the color image-forming unit A when it is at a non-operative position where the photoconductive drums are out of contact engagement with the transfer rollers.

FIG. 5 illustrates the color image-forming unit A when it is at a non-operative position where the photoconductive drums are out of contact engagement with the transfer rollers.

Upon power-up, the controller 81 of the color image recording apparatus 1 causes the motor drive circuit 92 to drive the cam motor 25 into rotation. When the photosensor 27 detects the slit 26a in the disc 26, the controller 81 causes the cam motor 25 to stop. This is the position shown in FIG. 5 where the color image forming unit A of FIG. 2 is at the non-operative position.

Thereafter, the controller 81 performs initialization of the recording apparatus 1 and then causes the motor 106 to drive the heat roller 64 in rotation, thereby cleaning the surface of the heat roller 64 with a cleaning pad 70. At the same time, the controller 81 causes the fixing unit controlling circuit 91 to preheat the heat roller 64 to a predetermined temperature. This preheat operation is also performed when the image recording apparatus 1 returns from a sleep mode where electric power to the heat roller 64 is temporarily shut off to save electric power when no printing is performed for a period longer than a predetermined length of time. The fixing unit controlling circuit 91 controls the heat roller 64 at a constant temperature.

When the heat roller 64 reaches the predetermined temperature, the controller 81 causes the motor drive circuit 92 to drive the motor 105, thereby driving the drive roller 30 in rotation so that the carrier belt 20 runs in a direction shown by arrow E and the cleaning blade 33 scrapes residual toner and dirt deposited on the carrier belt 20 into toner tank 34. When the carrier belt 20 has run a little longer than one complete rotation, the motor 105 is stopped so that the carrier belt 20 stops. During the cleaning operation, the motors 100–103 are also driven in rotation, and the controller 81 turns on the SP bias power supply 82, DB bias power supply 83, and charging power supply 84, thereby applying predetermined high voltages to the charging rollers 7, developing rollers 9, and sponge rollers After completion of the initialization, the controller 81 waits for image data which will be received through the interface 80 from an external device. The aforementioned initialization is also performed shortly after the cover of the color image recording apparatus 1 is opened for replacement of the image forming sections or removal of jammed print paper, and subsequently closed.

Upon receiving the image data through the interface 90 from the host computer, the controller 81 provides instructions to the interface 90 and the image memory 89. In response to the instruction, the interface 90 separates the received image data for one page of the recording medium S into the images data for the respective colors and stores the separated image data into the corresponding areas in the image memory 89.

Upon determining that the received image data is color image data, the controller 81 causes the motor drive circuit 92 to drive the cam motor 25, thereby moving the color image forming unit A to the operative position shown in FIG. 1. In other words, the color image forming unit A is moved to the position where the photoconductive drums 6Y, 6M, and 6C are brought into contact with the carrier belt 20, and then causes the cam motor 25 to stop. The movement of the color image forming unit A from the position shown in FIG. 5 to the position shown in FIG. 1 is controlled in terms of the number of steps of rotation of the cam motor 25.

With the color image-forming unit A at the position shown in FIG. 5, the printing operation starts.

The controller 81 causes the motor drive circuit 92 to drive the motor 104 to rotate the pick-up roller 46. The pick-up roller 46 rotates to feed one page of the recording medium S from the recording medium tray 41 into the guides 48 and 49. The controller 81 causes the motor drive circuit 92 to rotate the pick-up roller 46 so that the leading end of the recording medium S travels over a distance little longer than the distance between the first registry roller 51 and the recording medium tray 41. This allows the leading end of the recording medium S to abut the contact area between the first registry roller 51 and the recording medium tray 41 so that the recording medium S has some slack, thereby eliminating the skew of the recording medium S.

The controller 81 causes the motor drive circuit 92 to drive the motors 100–103 and 105–106, thereby driving in rotation the photoconductive drums 6Y, 6M, 6C, and 6K, charging roller 7Y, 7M, 7C, and 7K, developing rollers 9Y, 9M, 9C, and 9K, sponge rollers 11Y, 11M, 11C, and 11K, transfer rollers 4Y, 4M, 4C, and 4K, drive roller 30, transfer roller 50, and heat roller 64. At the same time, the controller 81 turns on the charging power supply 84, DB bias power supply 83, and SP bias power supply 82, thereby applying voltages to the charging rollers 7Y, 7M, 7C, and 7K, developing rollers 9Y, 9M, 9C, and 9K, and sponge rollers 11Y, 11M, 11C, 11K. In this manner, the surfaces of the photoconductive drums 6Y, 6M, 6C, and 6K are uniformly charged and the developing rollers 9Y, 9M, 9C, and 9K and sponge rollers 44Y, 11M, 11C, and 11K receive predetermined high voltages.

The transport roller 50 rotates in a direction shown by arrow G, so that the recording medium S is transported by the first and second registry rollers 51 and 52 through a medium guide 53 until the leading end of the recording medium S reaches between the attraction roller 54 and carrier belt 20. At this point of time, the controller 81 turns on the attraction power supply 86 to apply a high voltage to the attraction rollers 54. The leading end of the recording medium S is attracted by the Coulomb force developed by an electric field between the attraction roller 54 and driven roller 31. A further rotation of the transport roller 50 in the direction shown by arrow F allows the recording medium S to travel in the direction shown by arrow E, the recording medium S being attracted to the carrier belt 20. The sensor/receiver driver 96 informs the controller 81 that the photosensor 55 has detected the leading end of the recording medium S. When the trailing end of the recording medium S leaves the separator 44, the controller 81 causes the motor drive circuit 92 to stop the motor 104.

<Recording Operation>

The recording operation will be described.

A predetermined length of time after the transport roller 50 starts rotating, the controller 81 causes the image memory 89 to provide yellow image data for one line to the print controlling circuit 88. In accordance with an instruction from the controller 81, the print controlling circuit 88 reforms the image data from the image memory 89 into a form suitable for driving the LED head 3Y for yellow and transmits the reformed image data to the LED head 3Y. The LED head 3Y energizes LEDs therein in accordance with the image data, thereby forming a yellow electrostatic latent image for one page of recording medium. As the photoconductive drum 6Y rotates, the yellow electrostatic latent image is carried to the developing unit where the yellow electrostatic latent image is developed into a yellow toner image.

When the leading end of the recording medium S reaches between the photoconductive drum 6Y and transfer roller 4Y, the controller 81 turns on the transfer power supply 85 in order to apply the high voltage to the transfer roller 4Y, so that the yellow toner image on the photoconductive drum 6Y is transferred to the recording medium S. As the photoconductive drum 6Y rotates, the toner images are transferred line after line so that yellow image for one page is transferred to the recording medium S. A predetermined length of time after the trailing end of the recording medium S has passed between the photoconductive drum 6Y and transfer roller 4Y, the controller 81 shuts off the high voltage to the transfer roller 4Y.

The carrier belt 20 continues to run, carrying the recording medium S from the image forming section 2Y to the image forming section 2M where a magenta toner image is printed on the recording medium S.

The controller 81 sends an instruction to the image memory 89 in which magenta image data is stored, so that the memory provides the magenta image data for one line to the print controlling circuit 88. In accordance with the instruction from the controller 81, the print controlling circuit 88 reforms the magenta image data from the image memory 89 into a form suitable for driving the LED head 3M, and transmits the reformed image data to the LED head 3M. The LED head 3M energizes LEDs therein in accordance with the magenta image data, thereby forming a magenta electrostatic latent image for one page of recording medium. As the photoconductive drum 6M rotates, the electrostatic latent image is carried to the developing unit where the magenta electrostatic latent image is developed into a magenta toner image. Subsequent operation is the same as in the yellow image and the description thereof is omitted.

The recording medium S further travels from the image forming section 2M to the image forming section 2C where image for cyan is printed on the recording medium S. After the transfer of the toner image of cyan, the recording medium S advances to the second printing mechanism P2 where a black toner image is transferred to the recording medium S.

As described above, the toner images of the respective colors are transferred to the recording medium S in registration with one another. Thereafter, the recording medium S is carried on the carrier belt 20 to the neutralizing unit 60. The controller 81 turns the neutralizing power supply 87, thereby neutralizing the recording medium S so that the recording medium S leaves the carrier belt 20 without difficulty.

When the recording medium S passes over the drive roller 30, the recording medium S leaves the carrier belt 20 and is then guided by the guide 62 to the fixing unit 63. When the recording medium S leaves the neutralizing unit 63, the controller 81 turns off the neutralizing power supply 87.

Then, the recording medium S passes through the fixing unit 63 where the colored toner images are fused on the recording medium S into a full color image. Thereafter, the recording medium S is delivered to the paper stacker 67. When the photo interrupter 61 detects the trailing end of the recording medium S, the controller 81 determines that the recording medium S has been discharged.

Upon discharging the recording medium S, the controller 81 causes the motor drive circuit 92 to stop the motors 105 and 106. The controller 81 also turns off the charging power supply 84, SP bias power supply 82, DB bias power supply 83, and transfer power supply 85. As mentioned above, a color image is recorded on the recording medium S.

Likewise, a color image can be recorded on a recording medium that is manually inserted through the manual insertion tray 56. That is, a user sets the recording medium S into the manual insertion tray 56. The photosensor 58 detects the recording medium S and provides a detection signal to the sensor receiver/driver 96, which in turn informs the controller 81 of the insertion of the recording medium S. Then, the controller 81 causes the motor drive circuit 92 to drive the cam motor 25, thereby bringing the color image forming unit A to the position shown in FIG. 1. Then, the controller 81 drives in rotation the photoconductive drums 6Y, 6M, 6C, and 6K, charging roller 7Y, 7M, 7C, and 7K, developing roller 9Y, 9M, 9C, and 9K, sponge roller 11Y, 11M, 11C, 11K, transfer roller 4Y, 4M, 4C, and 4K, drive roller 30, and heat roller 64. At the same time, the controller 81 turns on the attraction power supply 86 to apply a voltage to the attraction roller 54.

The rotation of the transport roller 50 in the direction shown by arrow G allows the recording medium S, sandwiched between the transport roller 50 and second registry roller 52 to further advance to the attraction roller 54 through the medium guide 53. The rest of the operation is the same as the case in which the recording medium S is automatically fed from the medium tray 41 and the description thereof is omitted.

<Transferring image data in parallel>
<<Color Printing>>

The print data is checked on a page-by-page basis to determine whether the image data is for the monochrome printing or the color printing.

The first embodiment is characterized in that the controller 81 transmits yellow, magenta, cyan, and black image data in parallel to the LED heads 3Y, 3M, 3C, and 3K, respectively.

Figure 6:
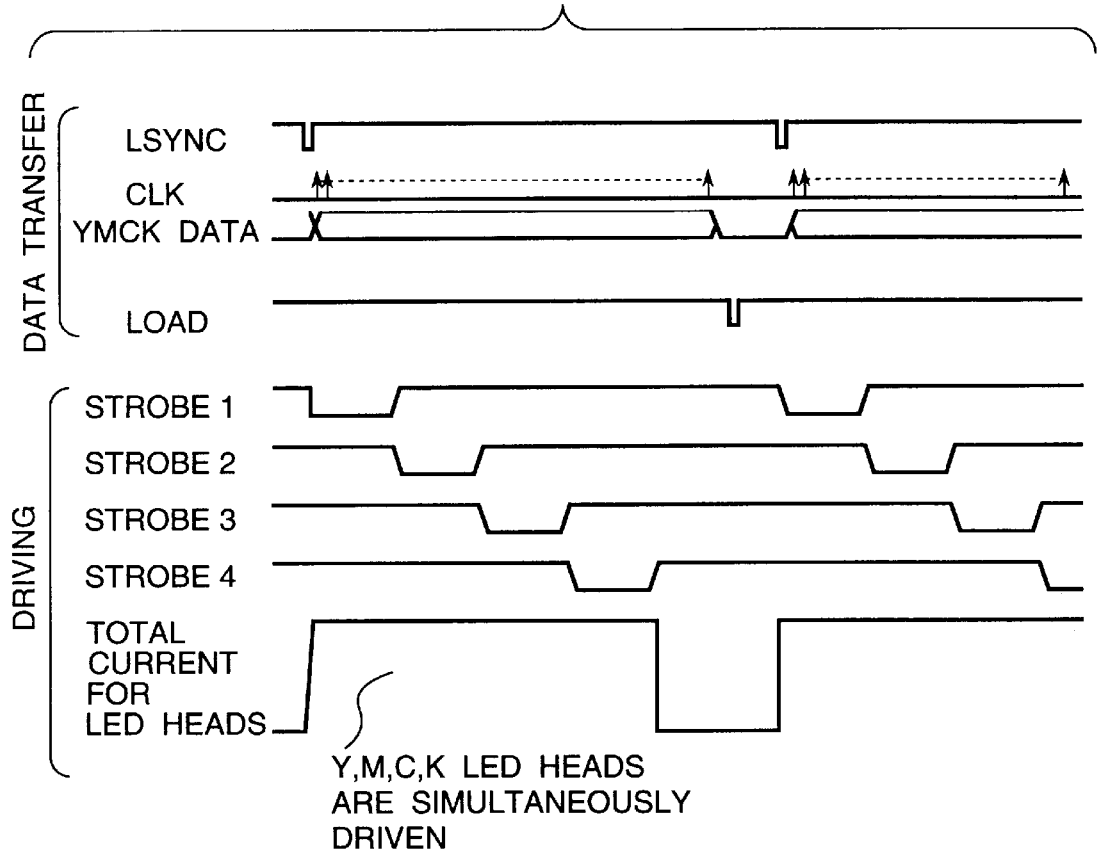
FIG. 6 is a timing chart illustrating the operation of the LED heads.

FIG. 6 is a timing chart illustrating the operation of the LED heads. The controller 81 causes the print control circuit 88 to transmit image data to the LED heads 3Y, 3M, 3C, and 3K on a line-by-line basis, each line extending in the traverse direction perpendicular to the advance direction in which the recording medium S travels. The image data for one line (e.g., 2560 bits or dots for 300 dpi) is transmitted to each of the LED heads upon a sync signal LSYNC over the respective data lines, each bit of the image data being attended by a clock CLK. The signal LSYNC is a print timing signal at which image data for one line is transferred to a corresponding LED head.

When the image data for one line has been transferred to the LED heads 3Y, 3M, 3C, and 3K, the controller 81 provides load signals LOAD to the LED heads 3Y, 3M, 3C, and 3K, so that the LED heads 3Y, 3M, 3C, and 3K hold the corresponding image data for one line. Upon the next LSYNC, LEDs of the each LED head are driven in accordance with the image data for one line held in the LED head. The LEDs of each LED head are grouped into four groups, each group including 2560/4=640 dots. The four groups of LEDs are energized during strobe signals STROBE 1 to STROBE 4. The four LED heads operate in response to the same LSYNC and therefore the four LED heads are driven simultaneously. This implies that a power supply should have a current capacity four times larger than that required for driving LEDs (i.e., 640 dots) during each of the strobe signals STROBE1 to STROBE4.

If all the LEDs of the image forming sections 2Y, 2M, 2C, and 2K are to be energized simultaneously, the power supply must have a current capacity still four times that described above, i.e., 8 times the current required for driving LEDs during each strobe signal. This increases the size of the recording apparatus. For this reason, the LEDs for each line are driven in a time-division method using the strobe signals STROBE1 to STROBE4.

<<Monochrome Printing>>

Prior to the transmission of the image data, the host computer outputs a command indicating whether the transmitted image data is for the monochrome printing or for the color printing. Upon receiving the image data for the monochrome printing from the host computer via the interface 90, the controller 81 instructs the interface 90 to store the received monochrome image data into the image memory 89. The controller 81 causes the motor drive circuit 92 to drive the cam motor 25 in rotation, thereby bringing the color image forming unit A to the non-operative position shown in FIG. 5. Thus, the photoconductive drums 6Y, 6M, and 6C are in out of contact engagement with the carrier belt 20.

The drums and rollers of the color image-forming unit A are not driven in rotation during the monochrome printing. The voltages for these rollers are not applied. Then, the recording medium S is fed from the paper feeding mechanism 40.

The recording medium S is then attracted to the carrier belt 20 which transports the recording medium S to the black image forming section 2K where a black toner image is transferred to the recording medium S. This operation is much the same as in the color printing except that the image forming sections 2K is operated at a faster speed(e.g. , four times) than the image forming sections 2Y, 2M, and 2C.

The controller 81 causes the motor drive circuit 92 to select either the monochrome printing speed or the color printing speed depending on the kind of printing.

In the present invention, only the LED head 3K is operated in the monochrome printing. If the monochrome printing is to be performed at the same speed as the color printing, the required drive current capacity of the power supply can be ¼ of that required for the color printing. This implies that the exposing cycle in the monochrome can be four times as fast as that in the monochrome printing if the power supply operates to its full capacity.

Figure 7:
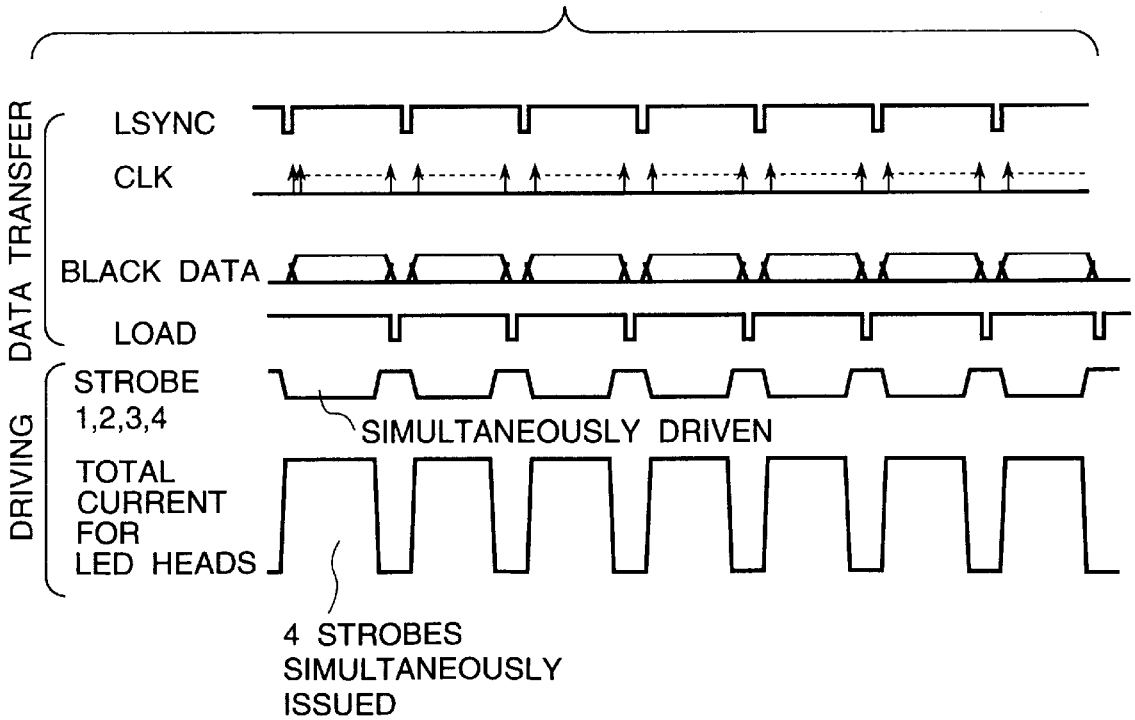
FIG. 7 is a timing chart illustrating the operation of the LED heads.

FIG. 7 is a timing chart illustrating the operation of the LED heads.

It is to be noted that LSYNC is four times faster in the monochrome printing than in the color printing. The image data DATA, clock CLK, and load LOAD are the same as in the color printing. Each bit of the image data DATA is attended by the clock CLK which is four times faster in the monochrome printing than in the color printing.

The strobe signals STROBE1 TO STROBE4 are simultaneously outputted so that all the LEDs in one line are energized simultaneously. Simultaneously energizing all the LEDs allows exposure of one line in a time of ¼ of that required in the color printing. It is to be noted that the current capacity required in the monochrome printing is substantially the same as that required in the color printing.

As described above, in the monochrome printing, the color image forming unit A is brought to the non-operative position (FIG. 5), and the recording medium S is fed at high speed, and the black image forming section 2K is operated at high speed. Thus, a high-speed monochrome printing can be achieved without increasing the current capacity of the power supply. A check is made on a page-by-page basis to determine whether the image data is for the monochrome printing or the color printing. Thus, the monochrome printing can be performed at high speed even if the print data includes monochrome pages mixed with color pages, thereby shortening the overall printing time.

<Modification of transferring image data in parallel>

This is a modification of the first embodiment and characterized in that the LED head for black image is of a high intensity type.

The LED head 3K uses LEDs having light emission about four times that of the LED heads 3Y, 3M, and 3C. The rest of the construction is the same as the first embodiment.

In the first embodiment, STROBE1 to STROBE 4 are simultaneously issued in the high-speed monochrome printing. Thus, current drawn by the LED head 3K in the monochrome printing can be up to four times that drawn by the respective LED heads in the color printing, depending on the number of dots to be printed in the line. This large current causes some voltage drops due to resistance in wires in the LED head 3K, resulting in variations in light spot size. The variation in light spot size causes detectable variation in dot size with increasing number of printed dots. Such variation in dot size is not a problem in character-only prints but somewhat degrades the print quality in relatively dark prints such as gray scale images.

Figure 8:
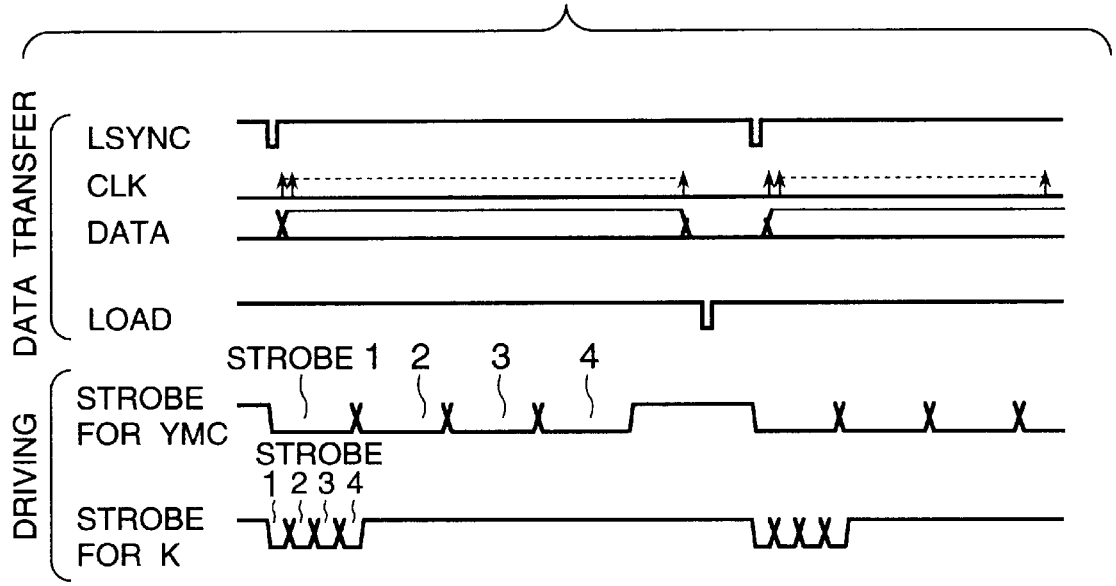
FIGS. 8 and 9 are timing charts illustrating the operation for driving the LED heads, FIG. 8 showing the color printing and FIG. 9 showing the monochrome printing.
Figure 9:
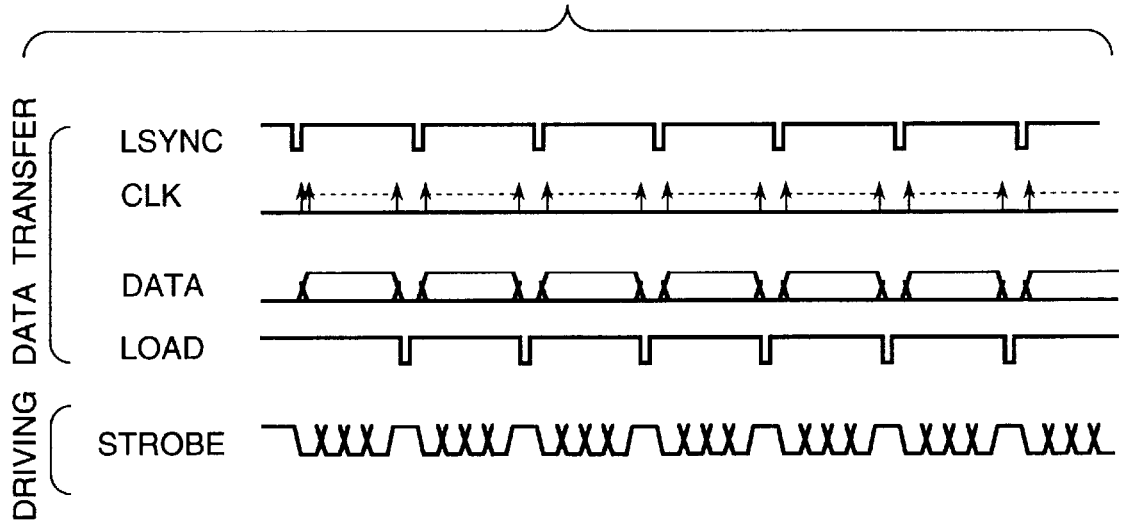

FIGS. 8 and 9 are timing charts illustrating the operation for driving the LED heads, FIG. 8 showing the color printing and FIG. 9 showing the monochrome printing.

For the color printing, since the LED head 3K uses LEDs having an intensity four times as high as those for the LED heads for other colors. Thus, the time required for driving the LED head 3K during each of STROBE 1 to STROBE4 is ¼ of that required for the driving the LED heads for the other colors.

As shown in FIG. 9, the time required for driving the LED head 3K in the monochrome printing is the same as in the color printing. Thus, no detectable voltage drops develop in the LED head 3K, not causing dot variations and offering good print quality.

Modification of First Embodiment
<Construction>

This modification is characterized in that a controller 110 transfers yellow, magenta, cyan, and black image data in serial to the LED heads 3Y, 3M, 3C, and 3K.

FIG. 10 illustrates an interface between the controller 110 and the print engine 120 of the image recording apparatus 1. The expression "-N" at the end of the name of each signal indicates that the signal becomes active when it goes low. For example, LSYNC-k-N represents that LSYNC for a black becomes active or valid when it goes low.

FIG. 11 is a block diagram showing an overall construction of the image recording apparatus 1.

Referring to FIG. 11, the image recording apparatus 1 includes a controller 110 that controls the printing operation and a print engine 120. The controller 110 includes an interface 112 connected to a host apparatus 111, processor 114, program memory 115, working memory 116, font memory 117, image memory 118, and print engine interface 119, which are connected to the interface 112 via a system bus 113.

The processor 114 performs the overall operations of the controller 110 under the control of an operation program stored in the program memory. The working memory 116 temporarily stores parameters for the printing operation and other data. The font memory 117 stores, for example, font data for printing. The image memory 118 store the print data received from the host apparatus 111 through the interface 112, and holds the print data until the printing operation completes.

The print engine 120 has a mechanical controller 120a (PU) and a printing mechanism 120b. The controller 110 provides the print data 119a to the print engine 120 through the print engine interface 119, and receives print controls signal 119b from the print engine 120 through the print interface 119.

The host apparatus 111 is, for example, a computer, word processor, or image reader and produces the print data and provides the print data to the controller 110. The interface 112 takes the form of, for example, RS232C interface or parallel interface. The print engine interface 119 reads the print data from the image memory 118 in response to the instruction issued from the processor 114 and transfers the print data to the print engine 20. The print engine interface 119 also receives print control signal 119b output from the print engine 120 and transmits the interface control signal 119b to, for example, the processor 114.

The image recording apparatus of the aforementioned construction receives the print data from the host apparatus 1 through the interface 112. The image recording apparatus also control commands, characters, graphic commands, bit image data and so on and temporarily stores them into the working memory 116 appropriately. The processor 114 in the controller 10 reforms the print data and stores in the image memory 118, and subsequently transfers the print data from the image memory 118 to the print engine. The printing mechanism 120b of the print engine 120 is of the same construction as in the first embodiment.

Referring to FIG. 10, the controller 110 communicates signals shown in FIG. 10 with the mechanical controller 120a. The print engine interface 119 includes a video interface 119A and a command interface 119B. The video interface 119A provides a print initiating signal PRINT-N to the print engine 120. The print engine 120 provides to the video interface 119A a print ready signal PRDY-N, feed initiating signal FSYNC-N indicating that a recording medium is being fed to a corresponding printing mechanism, and a line sync signal LSYNC-N indicative of a beginning of a line of image data.

The command interface 119B is an interface that transmits and receives various commands including a command that specifies a print color.

<Transferring image data in serial>
<<Color Printing>>

Figures 12A, 12B, 12C:
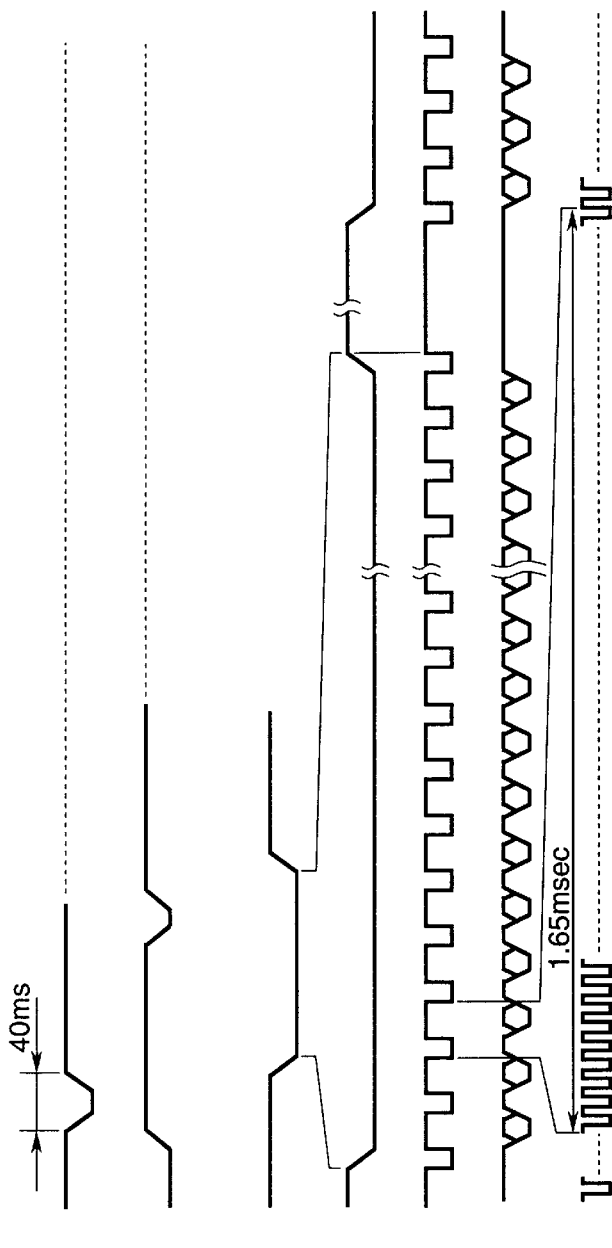
FIGS. 12A–12C are timing charts illustrating the transfer operation of print data.

FIGS. 12A–12C are timing charts illustrating the transfer operation of print data.

The operation of the print engine interface 9 shown in FIG. 10 will be described with reference to FIGS. 12A–12C.

The controller 10 provides the print initiating signal PRINT-N to the print engine 20 prior to the printing operation of one page of recording medium. In response to PRINT-N, the print engine 20 transmits PRDY-N to the controller 10. When a sensor located immediately in front of the printing mechanism detects the leading end of the recording medium being transported, the sensor outputs FSYNC-N and continues to output FSYNC-N until the recording medium has passed the printing mechanism. Waveform (d) is an expanded view of waveform (c).

When the LED head has received serial data WDATA for one line, the print engine 20 provides LSYNC (logic "0") to the controller 10, prompting the controller 10 to transmit WDATA for the next one line. Waveform (h) is an expanded view of LSYNC shown at (e) in FIG. 12A. When a gate signal LGATE-N becomes valid, WDATA for one line is transferred to the exposing unit.

Waveform (j) is an expanded view of WDATA and waveform (k) is an expanded view of WCLK. As shown by waveforms (k) and (1), each pulse of WCLK attends each bit of WDATA.

FIG. 13 is a timing chart illustrating the operation of the video interface 9A. Arrows show directions in which the respective waveforms are transmitted and received between the controller (CU) 10 and the print engine (PU) 20.

When the controller 10 transmits PRINT to the print engine 20 and receives PRDY from the print engine, the controller waits for FSYNC.

When the sensors detect the leading end of the recording medium, the sensors located immediately in front of the image recording sections for yellow, magenta, cyan, and black images provide FSYNC-Y-N, FSYNC-M-N, FSYNC-C-N, and FSYNC-K-N, respectively. Since the recording medium travels through the respective image forming sections in the order of yellow, magenta, cyan, and black, FSYNC-Y-N, FSYNC-M-N, FSYNC-C-N, and FSYNC-K-N are outputted in this order in such a way that a following FSYNC is outputted a predetermined time after a preceding FSYNC is outputted. This predetermined time is a time required for the recording medium to travel from a preceding sensor to the following sensor. During the periods of FSYNC-Y-N, FSYNC-M-N, FSYNC-C-N, and FSYNC-K-N, the LED heads 3Y, 3M, 3C, 3K receive WDATA for corresponding colors.

Figure 14:
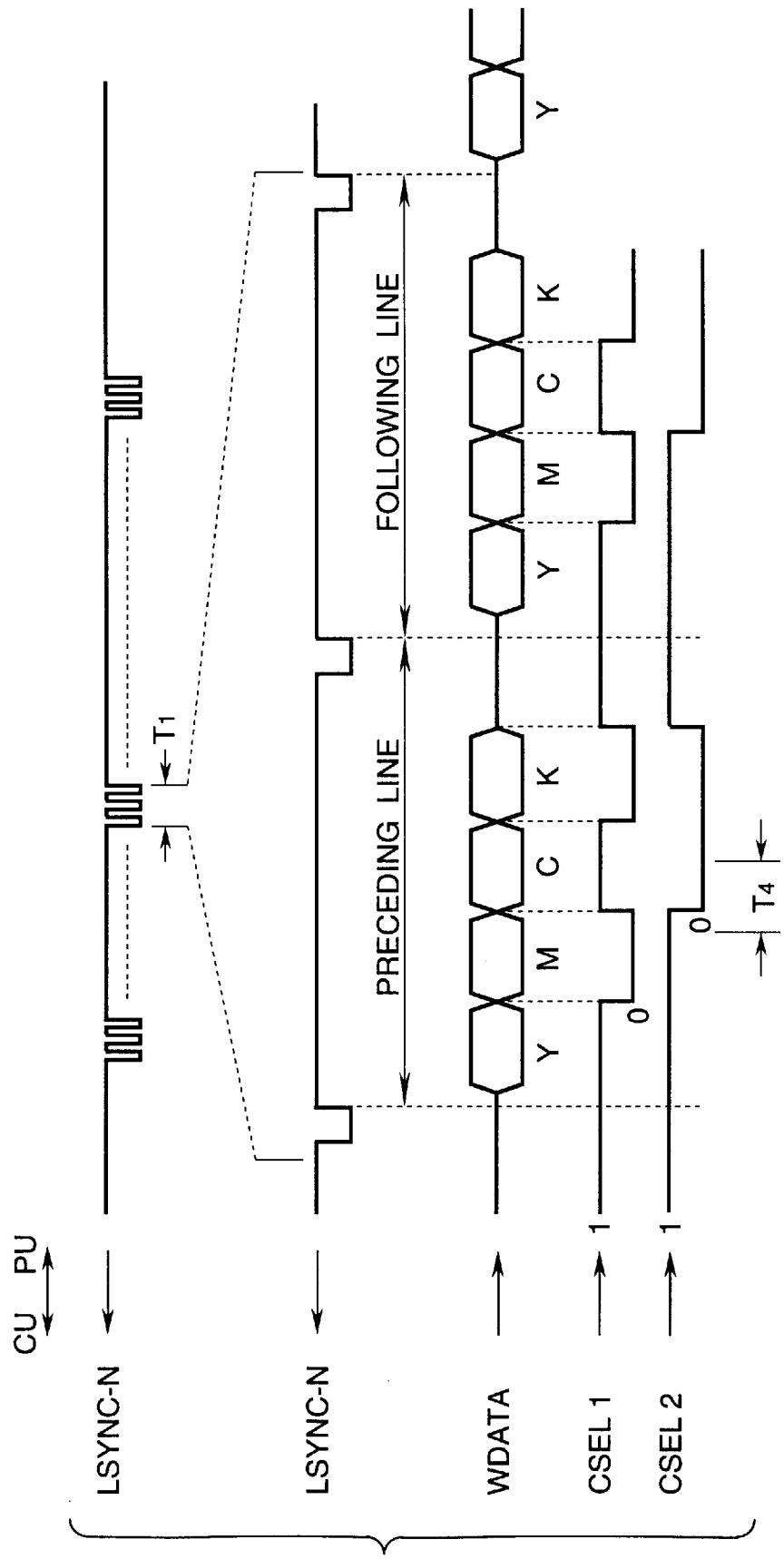
FIG. 14 illustrates the operation where WDATA for corresponding colors is selected by the color selecting signals CSEL1 and CSEL2.

FIG. 14 illustrates the operation where WDATA for corresponding colors is selected by the color selecting signals CSEL1 and CSEL2.

Referring to FIG. 14, time duration T1 of FIG. 13 is expanded to show the relationship among the LSYNC-N, WDATA, CSEL1, and CSEL2. Upon each LSYNC-N, WDATA is transmitted to the exposing unit of the print engine 20 in the order of yellow, magenta, cyan, and black. When both CSEL1 and CSEL2 are of a logic "1", the yellow image data Y is transmitted. When CSEL1 and CSEL2 are of logic "0" and logic "1", respectively, the magenta image data M is transmitted. When CSEL1 and CSEL2 are of logic "1" and logic "0", respectively, the cyan image data C is transmitted. When both CSEL1 and CSEL2 are of a logic "0", the black image data K is transmitted.

Figure 15:
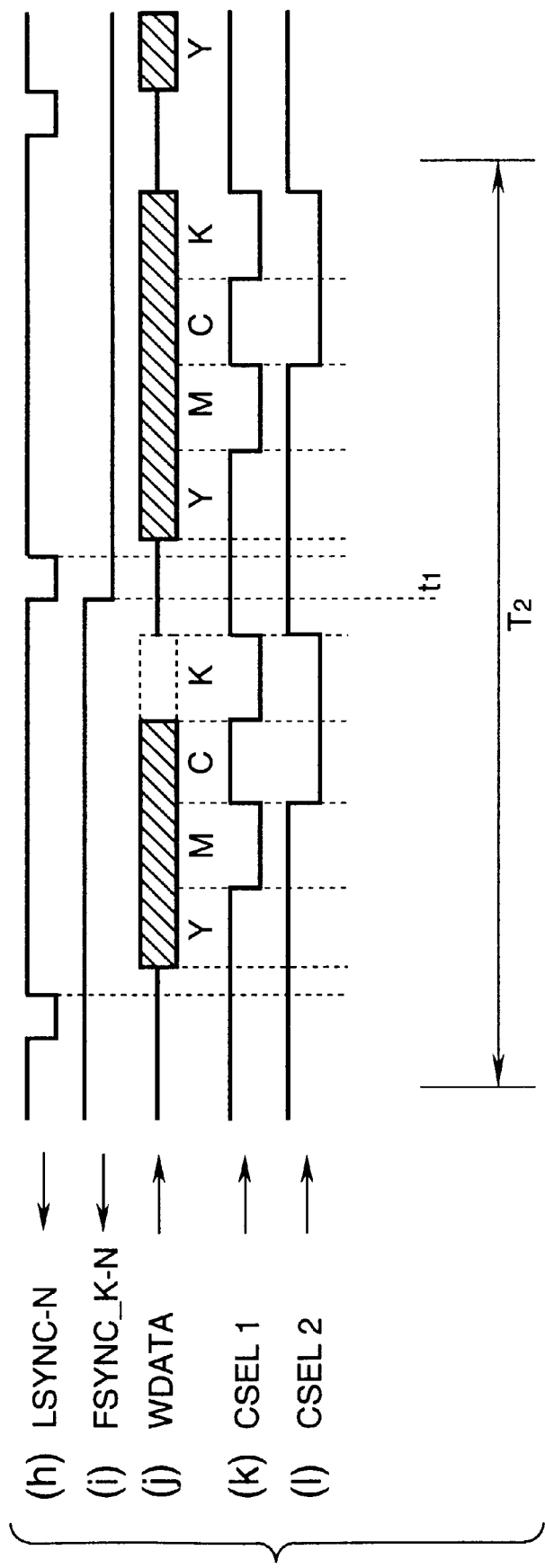
FIG. 15 illustrates the operation before and after FSYNC-K-N is issued.

FIG. 15 illustrates the operation before and after FSYNC-K-N is issued. Referring to FIG. 6, time duration T2 of FIG. 13 is expanded to show the relationship among the LSYNC-N, FSYNC-K-N, WDATA, CSEL1, and CSEL2. FSYNC-K becomes valid at time t1. Before time t1, the black image data K is not transmitted to the print engine 20. After time t1, the black image data K is transmitted when both CSEL1 and CSEL2 are of a logic "0". From time t1 onward, the image data Y, M, C, and K are transmitted until the entire image data Y for the page has been transmitted.

Figure 16:
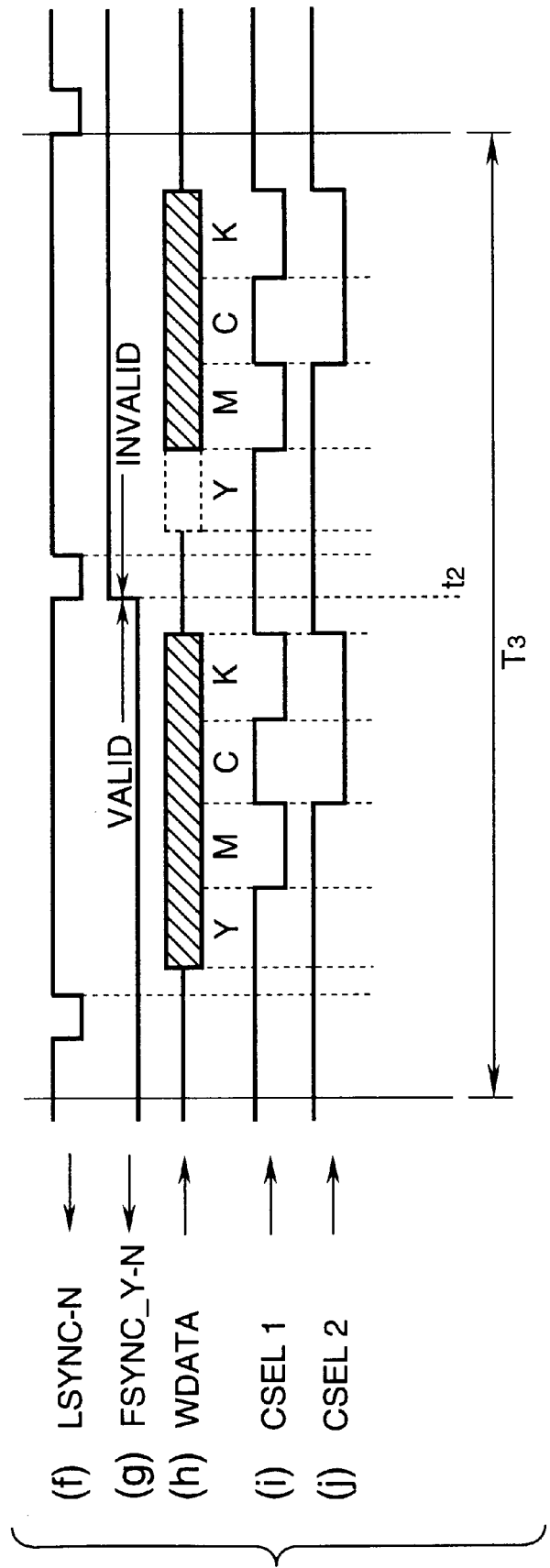
FIG. 16 illustrates the operation before and after FSYNC-Y-N becomes invalid.

FIG. 16 illustrates the operation before and after FSYNC-Y-N becomes invalid. Referring to FIG. 15, time duration T3 of FIG. 13 is expanded to show the relationship among the LSYNC-N, FSYNC-Y-N, WDATA, CSEL1, and CSEL2. FSYNC-Y becomes invalid at time t2 since the trailing end of the recording medium has passed the sensor at the yellow image forming section. Before time t2, the yellow image data for final one line of the page is transmitted to the print engine 20. After time t2, since FSYNC-Y is invalid. Thus, the yellow image data is not transmitted even when both CSEL1 and CSEL2 are of a logic "1". From time t2 onward, the image data M, C, and K are transmitted until all the image data M for the page has been transmitted.

Figure 17:
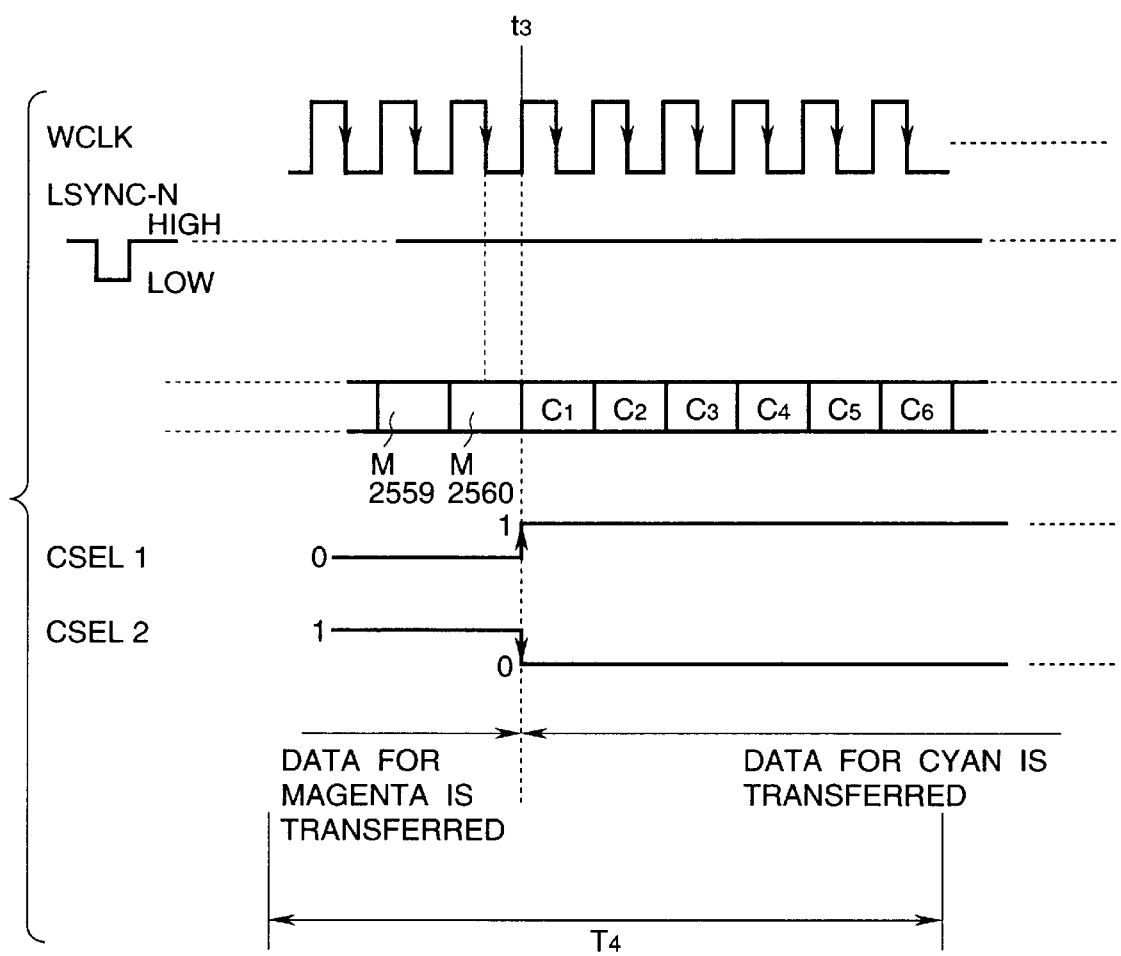
FIG. 17 illustrates the operation during time duration T4 of FIG. 13 to show how each bit of the image data is transmitted upon clock CLK.

FIG. 17 illustrates the operation during time duration T4 of FIG. 13 to show how each bit of the image data is transmitted upon clock CLK.

A command transmit signal CBSY-N (FIG. 17) becomes valid when the controller 10 transmits a command to the print engine 20. Commands SC-N are transmitted serially from the controller 10 to the print engine 20 and vice versa. The clock SCLK is a clock that attends each bits of a command when the command is transferred.

For example, the final bit M2560 of one line of the magenta image data is transmitted upon the trailing end of a clock WCLK. CSEL1 goes to "1" and CSEL2 goes to "0" at time t3. After time t3, each bit in one line of cyan image data is transmitted to the exposing unit of the print engine 20 upon the trailing end of the clock WCLK.

<<Monochrome Printing>>

Slow speed mode

Figure 18A:
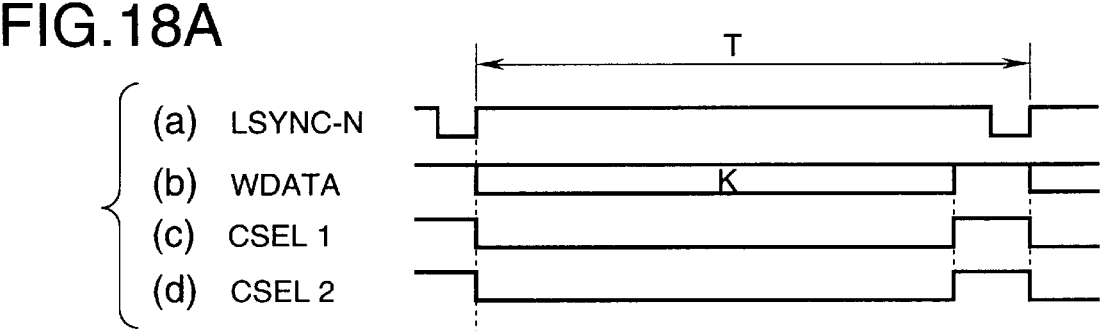
FIG. 18A illustrates the monochrome printing, which uses the aforementioned interface, at the same speed as in the color printing mode.

FIG. 18A illustrates the monochrome printing, which uses the aforementioned interface, at the same speed as in the color printing mode.

The controller 10 issues LSYNC-N at intervals of T which is the same as that of LSYNC shown in FIGS. 14–16. Here, by way of example, the monochrome printing of a black image will be described. The same operation can be equally performed for other colors.

Shortly after the LSYNC-N, WDATA for one line of a black image is transferred from the controller 10 to the print engine 20. CSEL1 and CSEL2 are both of a logic level "0" during the transfer of WDATA for the black image.

A black-and-white image and a color image have the same number of bits in one line of WDATA. Thus, if one line of a black-and-white image is to be transmitted during the time required for transmitting each line of yellow, magenta, cyan, and black image in the color printing, the clock frequency for transmitting one line of the black-and-white image can be ¼ of that required in the color printing. Thus, WDATA in the slow speed monochrome printing is transmitted at a speed of ¼ of that in the color printing. Using a slow clock frequency allows reduction of noise level to a sufficient level.

High speed mode

Next, a high-speed monochrome printing will be described.

Figure 18B:
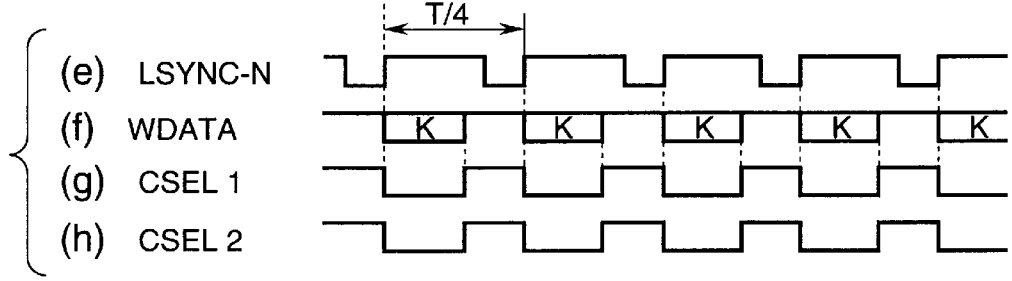
FIG. 18B illustrates the monochrome printing performed at a speed four times higher than the monochrome printing shown in FIG. 18A.

FIG. 18B illustrates the monochrome printing performed at a speed four times higher than the monochrome printing shown in FIG. 18A.

Both CSEL0 and CSEL2 are of logic "0", thereby specifying black image data. The line sync signal LSYNC-N is outputted at time intervals of T/4. The rest of the operation is the same as in the monochrome printing described with reference to FIG. 18A.

Since the clock frequency in the high-speed monochrome printing is the same as that in the color printing, there is no chance of noise increasing from a level in the color printing. Moreover, using the timings for the color printing at which one line of each of yellow, magenta, cyan, and black image data is transmitted can transmit four lines of black image data. Therefore, the effective speed of the data transfer in the high-speed monochrome printing is four times that of the color printing. As a result, the recording unit for black image can operate at a speed four times that of the color printing.

<Specifying Color through Command Interface>

The operation of the command interface 9B in the controller 10 will be described.

Although the monochrome printing is specified by the color selecting signals CSEL0 and CSEL2 in the examples described with reference to FIGS. 18A and 18B, the image forming sections of the respective colors may also be specified by using the command interface 9B.

Figure 19:
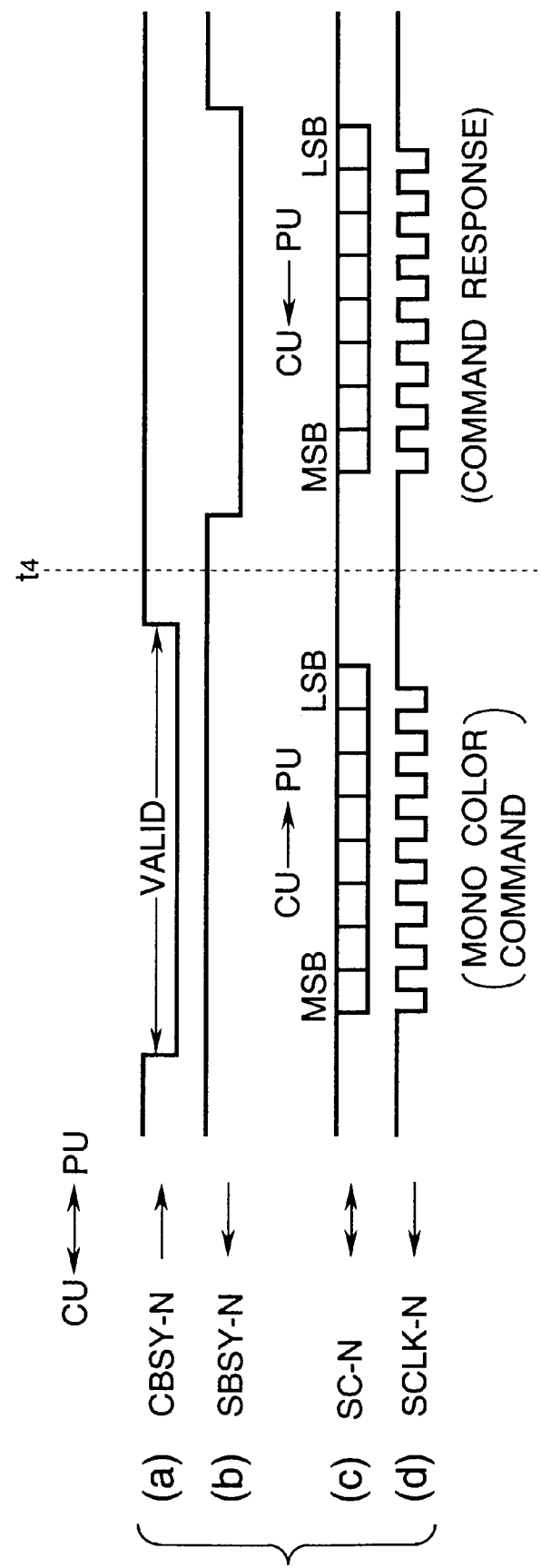
FIG. 19 is a timing chart illustration the operation of the command interface 9B.

FIG. 19 is a timing chart illustration the operation of the command interface 9B.

The controller 10 shown in FIG. 1 provides a command SC-N to the print engine 20 when CBSY-N is valid before time t4. The command SC-N is an 8-bit signal and each bit is transmitted from the controller 10 to the print engine 20 upon the clock SCLK.

Upon recognizing the command SC-N, the print engine 20 sends a command response to the controller 10 when a signal SBSY-N is valid (after time t4). Each bit of the command response or command SC-N is transmitted upon a pulse of clock SCLK. Then, the print engine 20 causes only the black image forming section to operate.

In this manner, the command can be used to specify the monochrome printing, thereby overriding the color-selecting signal CSEL-N. This command SC-N is a command to specify a single color such as black, magenta, and so on. The period T of the line sync LSYNC-N described with reference to FIG. 18A can also be specified. In other words, a command can be issued to set printing conditions such as high speed printing and low speed printing.

Figure 20:
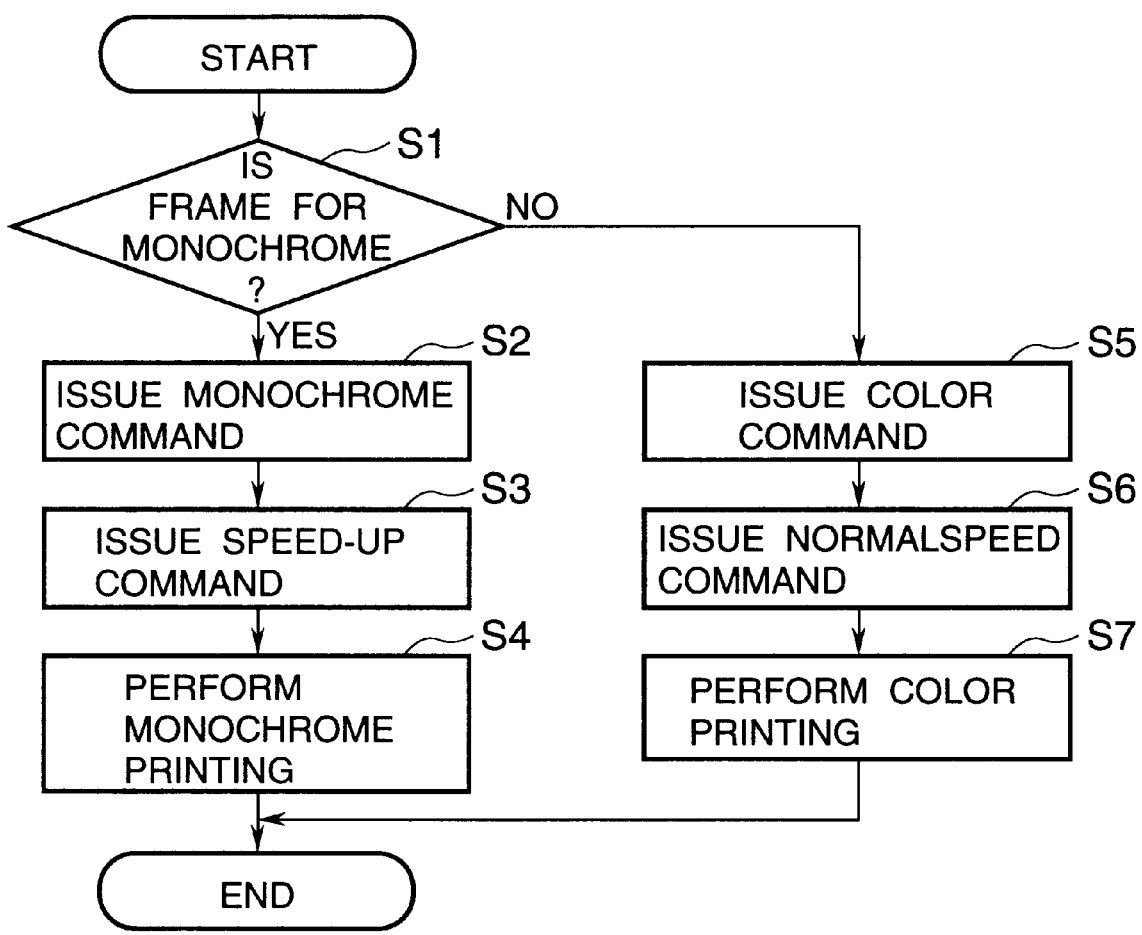
FIG. 20 is a flowchart illustrating the specific operation of the command interface 9B.

FIG. 20 is a flowchart illustrating the specific operation of the command interface 9B.

At step S1, the controller 10 checks the print data for one frame to determine whether the print data includes only a single color. A frame is a unit of data size that corresponds to one page of recording medium. If it is determined that the print data describes a black-and-white image, the program proceeds to step S2 where a monochrome command is issued to print the black-and-white image. Upon receiving the monochrome command, the print engine 20 is set to print only the black image.

At step S3, the controller 10 issues a high-speed command specifying a print mode shown in FIG. 18B. Then, at step S4, the monochrome printing is performed.

If it is determined that the print data describes a color image, the program proceeds to step S5 where commands for the respective colors are issued for the color printing. At step S6, a normal speed command is issued which specifies the printing at a normal speed (color print speed). At step S4, the monochrome printing is performed for the respective colors.

As described above, the print data can be transmitted at a high clock rate or at a low clock rate, thereby performing the monochrome printing at high speed or low speed. The aforementioned control may be implemented for not only electrophotographic printers, but also for thermal printers and ink jet printers.

Second Embodiment

A second embodiment is characterized in that in order to increase printing speed in the monochrome printing, black image data is processed not only by the circuits for black image but also by the circuits for yellow, magenta, and cyan images.

A color printer prints print data for four colors. Therefore, the image memory must have a larger capacity in the color printing than in the monochrome printing. For this reason, bit mad data received from a host apparatus is compressed before being stored in the image memory. The compressed image data is read from the image memory and outputted to the print engine, the compressed image data being expanded immediately before printing. The present embodiment is directed to an effective use of the compressing and expanding circuits in the monochrome printing.

Figure 21:
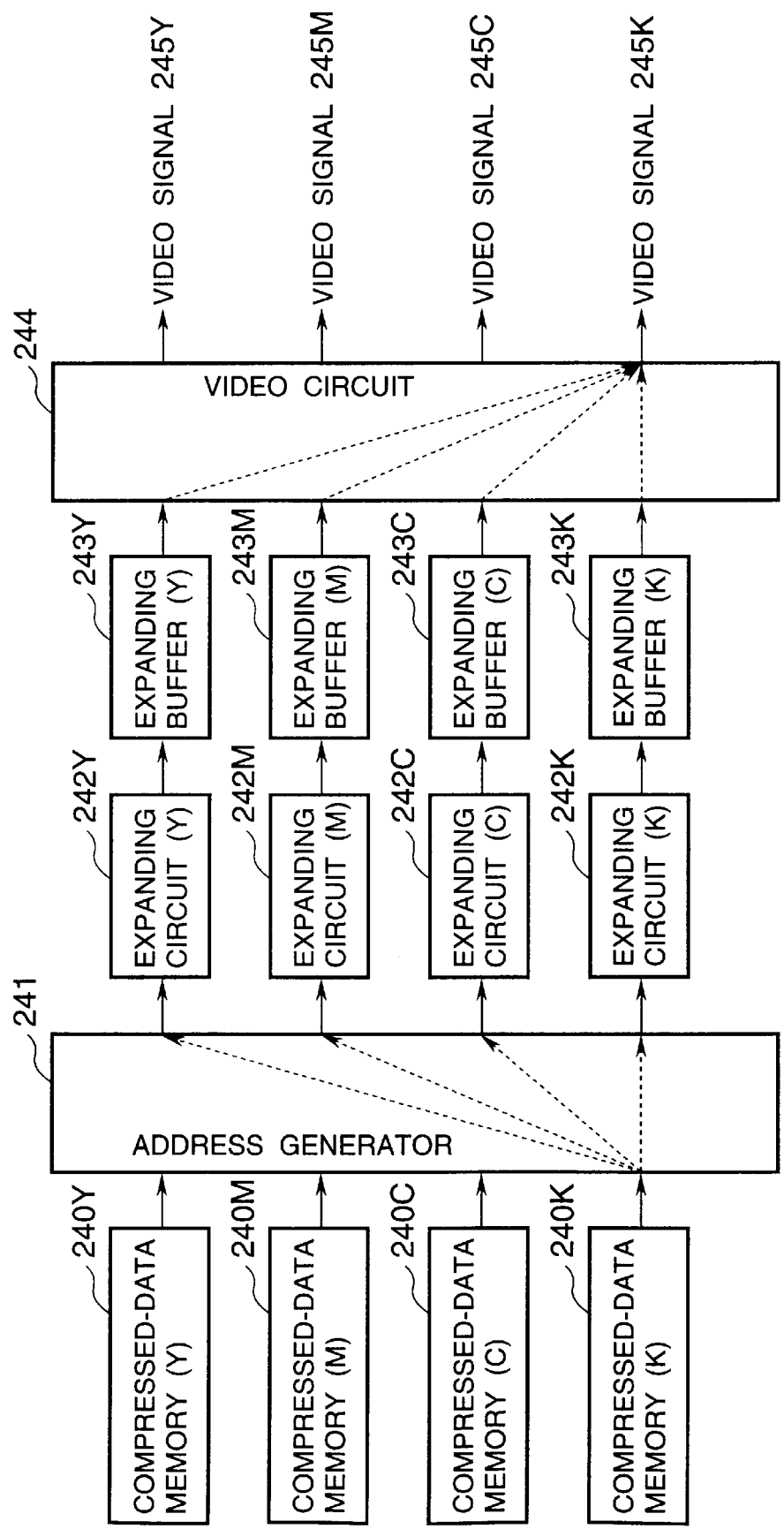
FIG. 21 is a block diagram illustrating the data processing of a second embodiment.

FIG. 21 is a block diagram illustrating the data processing in the present embodiment.

Referring to FIG. 21, compressed data memories 40Y, 40M, 40C, and 40K store compressed image data for yellow, magenta, cyan, and black images. The image data is compressed by using a well-known conventional method.

The expanding circuits 242Y, 242M, 242C, and 242K expand the image data for corresponding colors. Buffers 243Y, 243M, 243C, and 243K temporarily store the corresponding expanded image data. The expanded image data is converted into video signals 245Y, 245M, 245C, and 245K in the form of serial data and outputted to the print engine. The video circuit 244 is a timing controlling circuit, which reads the expanded image data from the buffers 243Y, 243M, 243C, and 243K and transfers the expanded data to the corresponding print engines.

An address generator 241 is disposed between the data memories 243Y, 243M, 243C, and 243K and the expanding circuits 242Y, 242M, 242C, and 242K. The address generator 241 includes, for example, a circuit that controls addresses so that the compressed data read from the memory 240Y is transferred to the expanding circuit 242Y. In the color printing, the video signals in the form of serial data are simultaneously and continuously transferred, and therefore the expanding circuits 242Y, 242M, 242C, and 242K operate simultaneously.

Conventionally, only an expanding circuit and a buffer that stores the expanded image data are operated in the monochrome printing. In the present embodiment, circuits provided for other colors are effectively used in the monochrome printing, thereby increasing the printing speed.

Specifically, the address generator 241 divides the compressed image data for a black-and-white image stored in the memory 240K into four items of data, and outputs the divided data to the corresponding expanding circuits 242Y, 242M, 242C, and 242K. The respective expanding circuits 242Y, 242M, 242C, and 242K expand the compressed data and store the expanded data into the buffers 243Y, 243M, 243C, and 243K, respectively. Then, the video circuit 244 rearrange the expanded data outputted from the buffers 243Y, 243M, 243C, and 243K into the original order before transferring the data as the video signal 245K to the print engine for black image.

Generally speaking, than the time required for expanding the compressed data is much longer time required for reading the compressed data from the memory 240K. Thus, use of a plurality of expanding circuits can increase processing speed. Using two expanding circuits increases the speed by a factor of two and using four expanding circuits increases the speed by a factor of four. In order to provide for such a control, the memory 240K stores the image data on a block basis.

Figure 22:
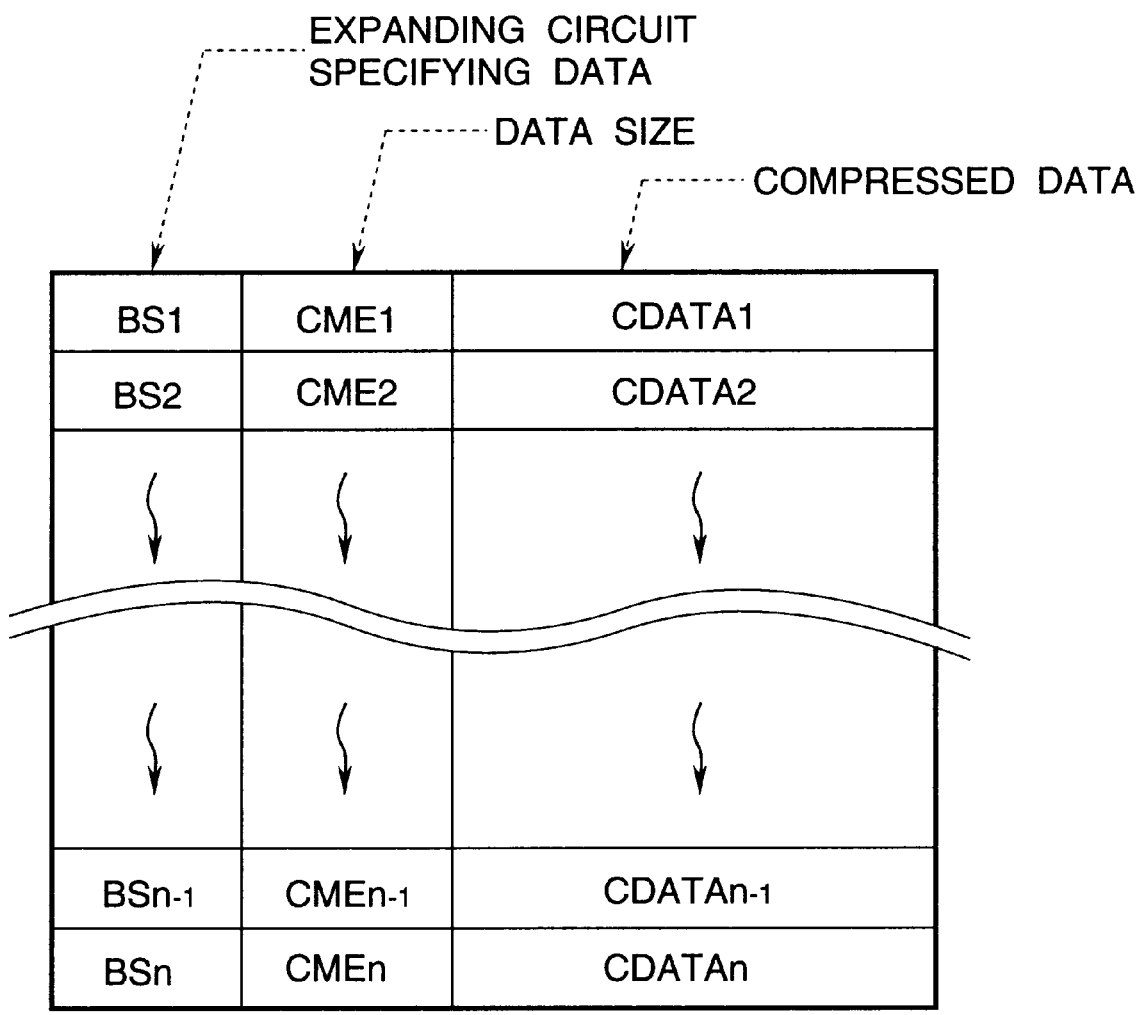
FIG. 22 illustrates the contents of the memory that stores the compressed data.

FIG. 22 illustrates the contents of the memory that stores the compressed data.

The compressed data is divided into a plurality of blocks such as CDATA1, CDATA2 . . . , CDATAn−1 and so on. Each block has a header that describes the data size of a corresponding block and expanding circuit specifying data BS1, BS2 . . . , BSn−1 and so on.

Thus, every time the address generator 241 reads a block of compressed data from the memory 240K, the address generator 241 checks the expanding circuit specifying data BSn of the block. Then, the address generator 241 generates an address of a corresponding expanding circuit and transfers the block to the expanding circuit. In the monochrome printing, by performing the processing repeatedly, the compressed data is distributed evenly to a plurality of expanding circuits for effectively processing the compressed data. The video circuit 244 reads image data corresponding to the blocks from the respective buffers 243Y, 243M, 243C, and 243K and outputs the image data in the order in which the image data is read from the buffers.

As mentioned above, when the color image recording apparatus performs the monochrome printing, circuits for other colors than black can be effectively used to increase the printing speed.

If the print engine is to perform the monochrome printing at a speed four times that in the color printing, the print data must also be processed four times faster. The expanding circuits process the largest amount of data of all the circuits in the recording apparatus and therefore are required to operate at the highest speed. The use of expanding circuits for other colors than black may achieve a high-speed monochrome printing while maintaining the same signal processing speed of the respective expanding circuits. This way of signal processing will not increase noise in the high-speed printing.

Modification of Second Embodiment

The aforementioned signal processing can be applied to various stages from reception of print data from a host apparatus till the print data is outputted to the print engine.

Figure 23:
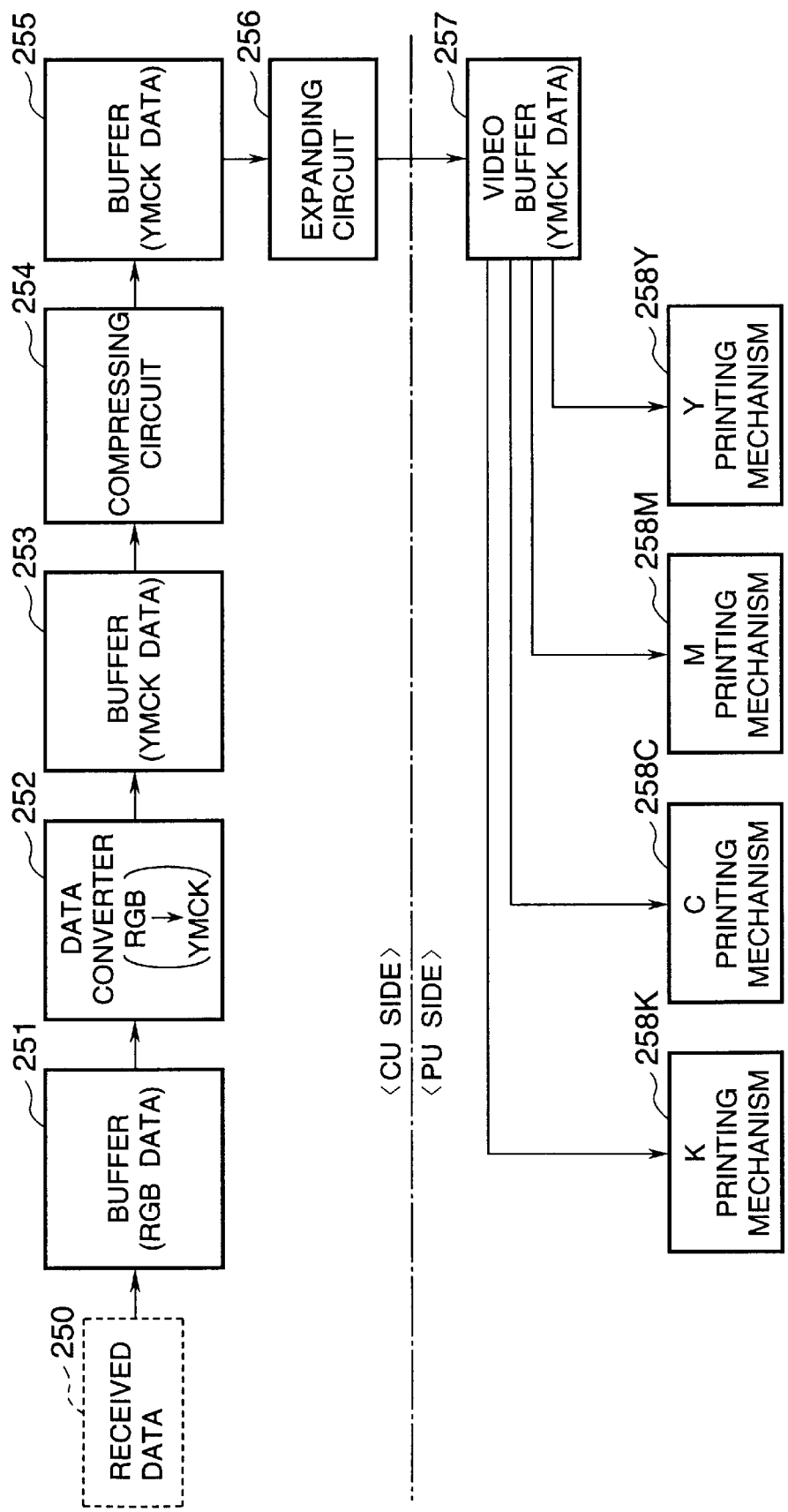
FIG. 23 is a block diagram illustrating the data processing in the present embodiment.

FIG. 23 is a block diagram illustrating the data processing in the present embodiment.

FIG. 23 illustrates the flow of data from reception of print data from a host apparatus till the outputting of the print data to the print engine. The print data 250 received from an external apparatus is first stored in a buffer 251. This data is RGB data used for displaying on a computer display. A data converter 252 converts the RGB data into YMCK data that can be printed. The YMCK data is stored into a buffer 253.

A compressing circuit 254 compresses the YMCK data and the compressed data is stored into a raster buffer 255. The data stored in the raster buffer 255 is sequentially expanded and transferred to a video buffer 257. In this manner, the YMCK data is provided to printing mechanisms 258Y, 258M, 258C, and 258K on a line-by-line basis.

Figure 24:
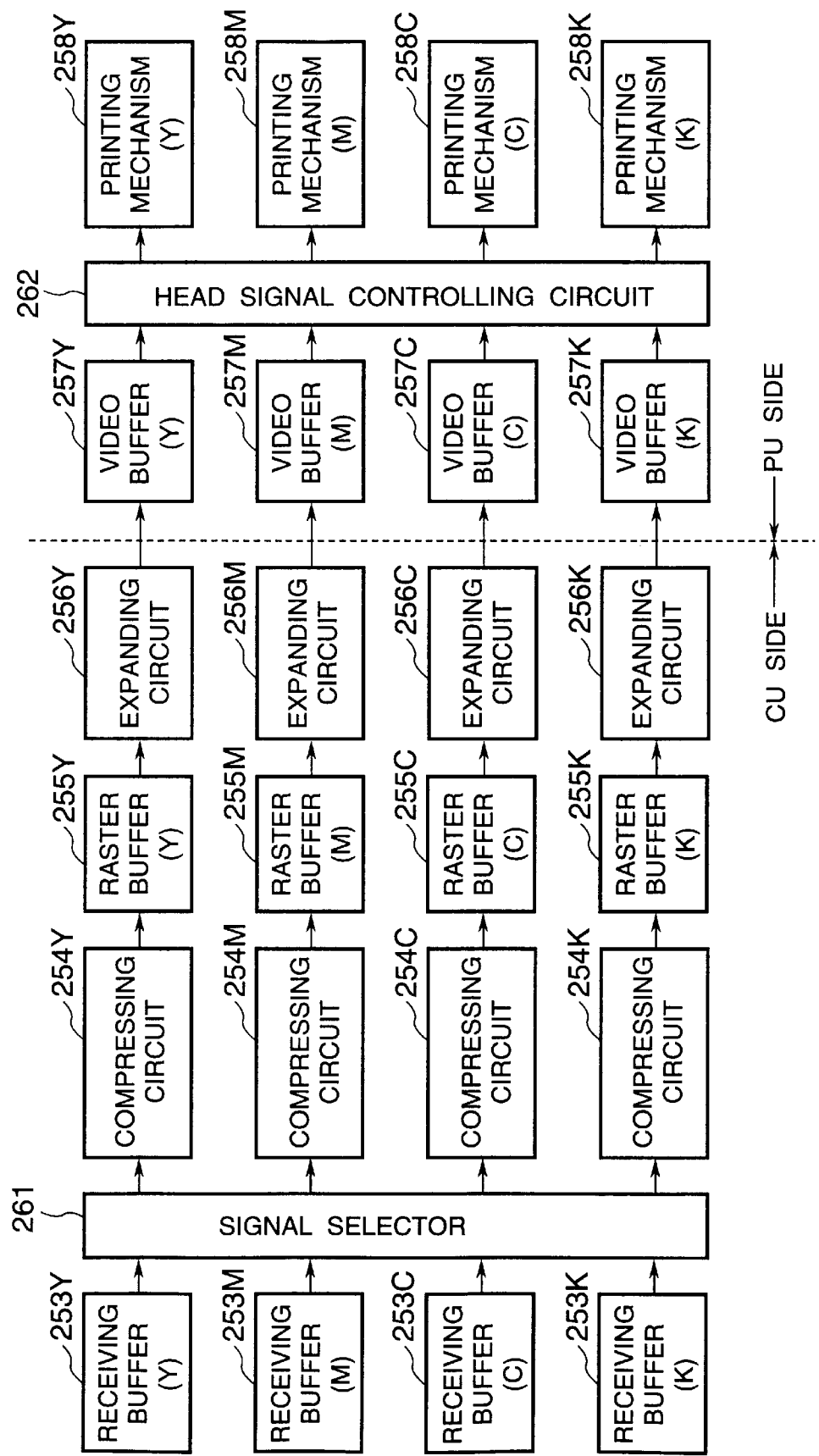
FIG. 24 is a block diagram illustrating the data processing in the present embodiment.

FIG. 24 is a block diagram illustrating the data processing in the present embodiment.

Each of yellow, magenta, cyan, and black image data is processed by buffers 253Y, 253M, 253C, and 253K, compressing circuit 254Y, 254M, 254C, and 254K, raster buffer 255Y, 255M, 255C, and 255K, expanding circuits 256Y, 256M, 256C, and 256K, video buffers 257Y, 257M, 257C, and 257K, respectively, aligned in this order.

A signal selector 61 is provided between the buffers 253Y, 253M, 253C, and 253K and the compressing circuits 254Y, 254M, 254C, 254K. The outputs of video buffers 257Y, 257M, 257C, and 257K are transferred through a head signal controlling circuit 62 to printing mechanisms 258Y, 258M, 258C, and 258K. The head signal controlling circuit 262 controls the transferring of video signals so that the video signals are transferred from the video buffers 257Y, 257M, 257C, and 257K to corresponding printing mechanisms 258Y, 258M, 258C, and 258K, respectively, on a line-by-line basis.

Just as described with reference to FIGS. 21–23, the present embodiment also uses circuits for other colors than black when performing the monochrome printing.

Specifically, the signal selector 261 divides the data for black-and-white image, stored in the buffer 253K, into four items of data and distributes the four items of data to the compressing circuits 254Y, 254M, 254C, and 254K, respectively. The data may be distributed on a block-by-block basis, each block including a predetermined amount of data just as in the second embodiment. Alternatively, the data may be distributed byte by byte or line-by-line. In any case, the compressing circuits 254Y, 254M, 254C, and 254K and expanding circuits 256Y, 256M, 256C, and 256K process portions of the data, so that the printing speed is increased.

The head signal controlling circuit 262 receives the data from the respective video buffers 257Y, 257M, 257C, and 257K in order and transfers the data to the printing mechanism 258K. In this manner, printing speed in the monochrome printing can be increased by a factor of four while maintaining the same data processing speed.

Figure 25:
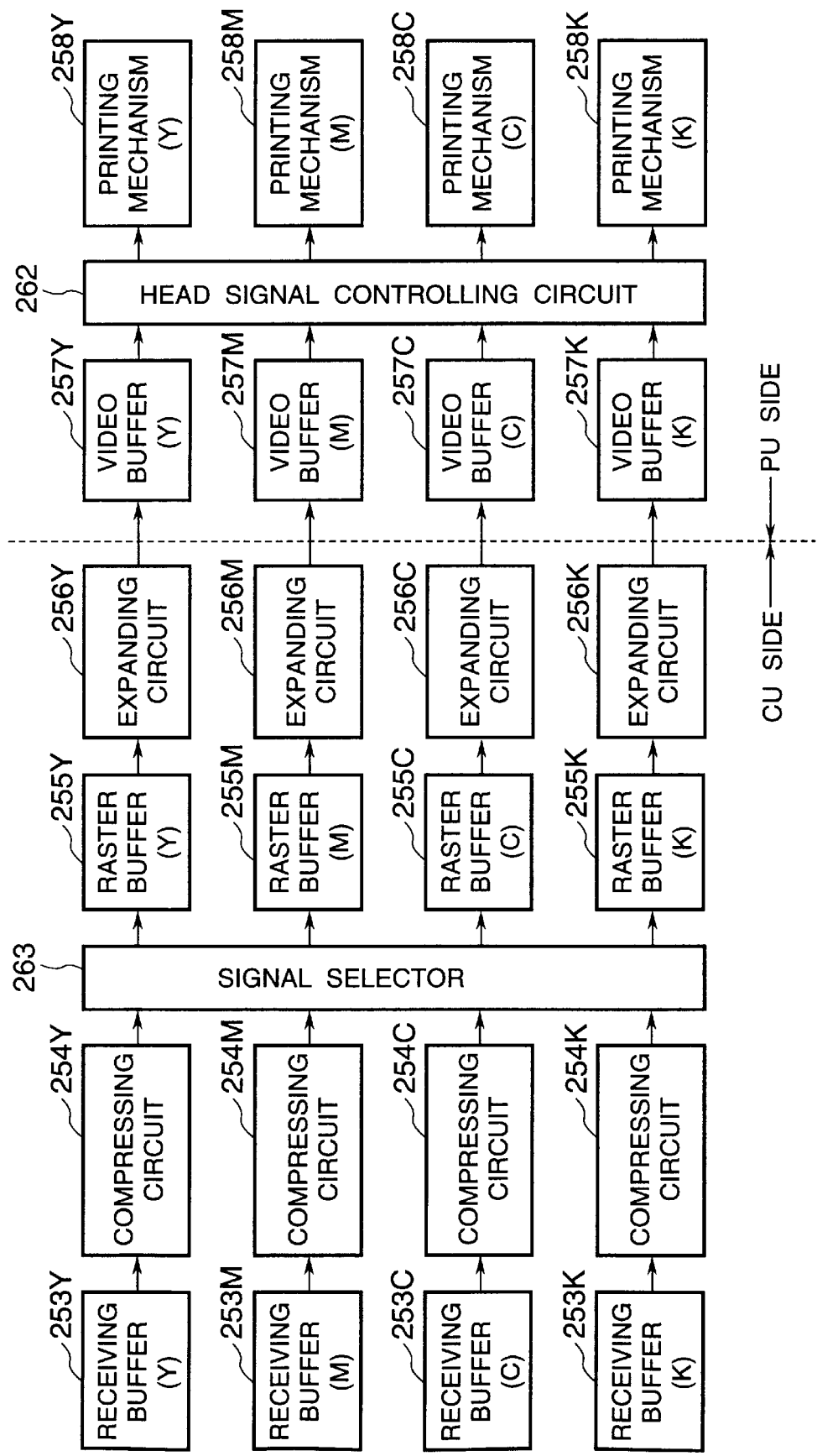
FIG. 25 is a block diagram illustrating another data processing.

FIG. 25 is a block diagram illustrating another data processing. The structure of the block diagram is much the same as that shown in FIG. 24 except that a signal selector 263 is located after the compressing circuits 254Y, 254M, 254C, and 254K. In other words, the signal selector 263 distributes the compressed data for black-and-white image to the raster buffers 255Y, 255M, 255C, and 255K when performing the monochrome printing of a black-and-white image.

As described earlier, the time required for expanding the compressed data outputted from the memory 40K is longer than other signal processing operations. Thus, use of all of the expanding circuits 256Y, 256M, 256C, and 256K can increase the signal processing speed. Moreover, using the raster buffers 255Y, 255M, 255C, and 255K both in the color printing and in the monochrome printing allows more effective use of memory resources than using the raster buffers only in the color printing.

Figure 26:
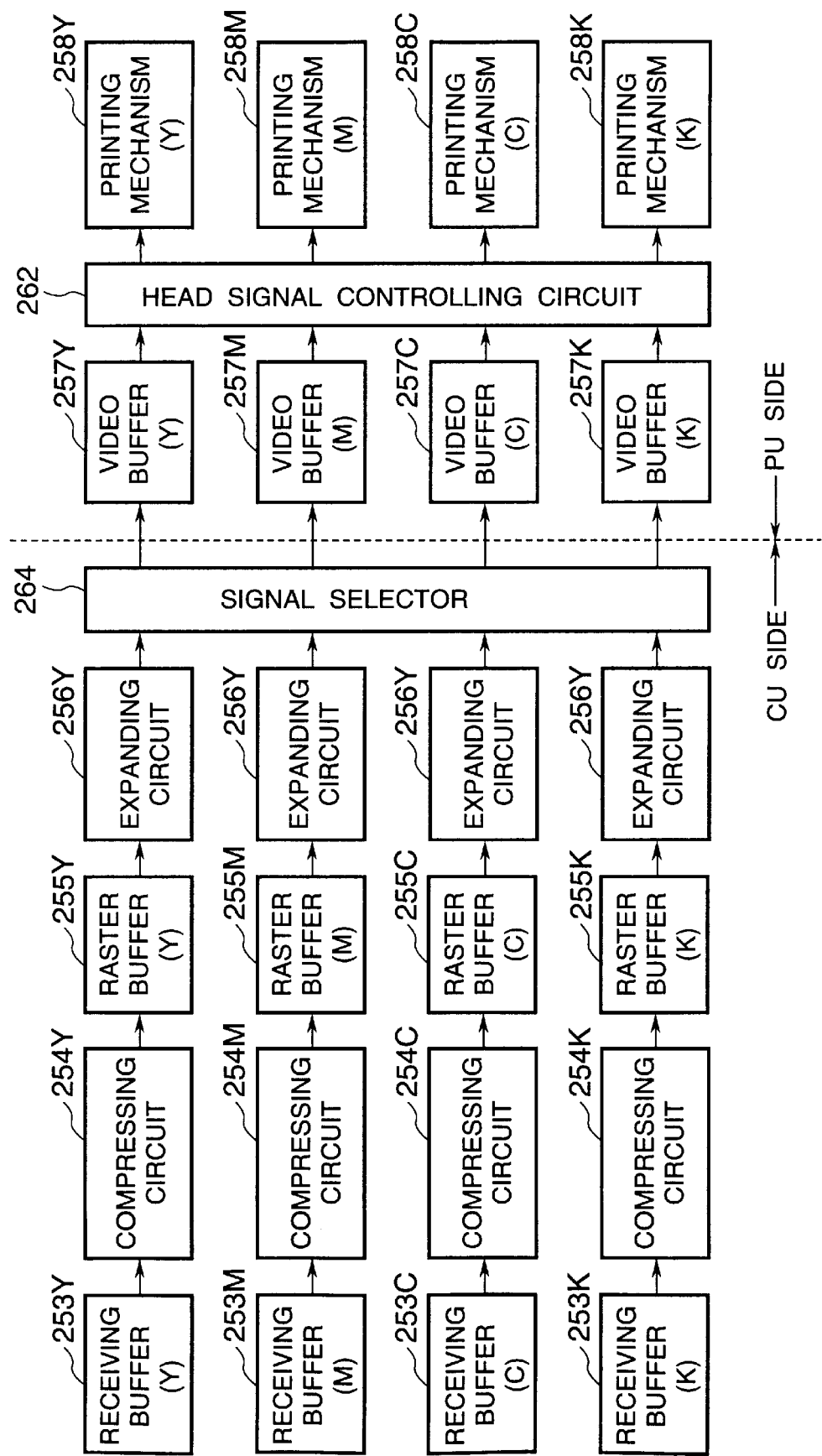
FIG. 26 is a block diagram illustrating still another data processing.

FIG. 26 is a block diagram illustrating still another data processing.

The structure of the block diagram is much the same as those shown in FIGS. 24 and 25 except that a signal selector 264 is located between the expanding circuits 256Y, 256M, 256C, and 256K and the video buffers 257Y, 257M, 257C, and 257K. The video buffers 257Y, 257M, 257C, and 257K are effectively used in the printing operation.

Conventionally, only a video buffer for a specific color is operated in the monochrome printing. Video buffers have only a limited capacity and often dictates the printing speed and other controls. According to the data processing shown in FIG. 26, video buffers for other colors than black may be effectively used in the monochrome printing, thereby increasing printing speed. The signal processing shown in FIG. 26 is particularly useful in a case where the signal processing takes a long time.

The configurations shown in FIGS. 24–26 can be applied not only to a black-and-white image but also to the monochrome printings of other colors. Although, the embodiment has been described with respect to a case where the circuits for all the colors are used, the printing speed may be increased by using circuits for only a limited number colors.

<Using four wires for increased printing speed>

This modification uses a 4-wire LED head that has four wires for receiving image data DATA.

Figure 27:
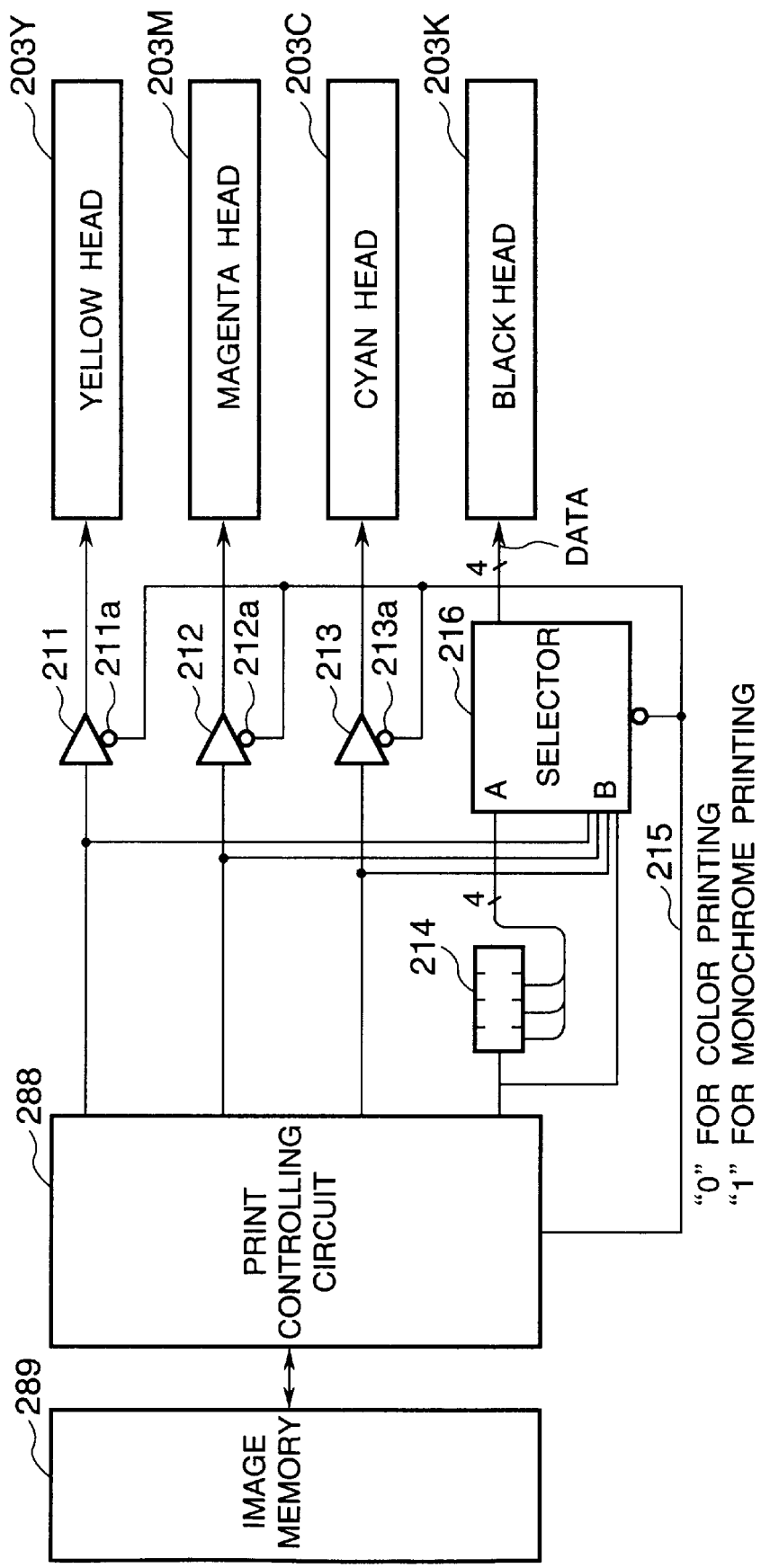
FIG. 27 is a block diagram illustrating the relevant portion of the embodiment.

FIG. 27 is a block diagram illustrating the relevant portion of the embodiment.

Referring to FIG. 27, a print controlling circuit 288 is connected to buffers 211–213 having output enabling terminals 211a–213a and to a 4-bit shift register 214. The outputs of the buffers 211–213 are connected to yellow LED head 203Y, magenta LED head 203M, and cyan LED head 203C, respectively. The buffers 211–213 are controlled to be "valid" or "invalid" in accordance with a selector signal 215 issued from the print controlling circuit 288.

The shift register 214 is connected to a 4-bit input type selector 216, which is connected to the black LED head 203K. The shift register 214 holds four bits of the black image data and outputs the four bit data to an A-input of the selector 216. The data lines of the respective colors are connected to a B-input of the selector 216. The black data output from the print controlling circuit 288 is also connected to the B-input. The selector 216 selects either the input or B input in accordance with the selector signal 215, and outputs the selected data.

In the first embodiment, the frequency of the clock CLK is increased in the monochrome printing, thereby transferring the data for a black image at an increased speed. If the data is transferred at a higher speed, then the LED head must operate at a higher speed accordingly. The embodiment addresses such a problem.

The operation of the second embodiment will be described.

Figure 28:
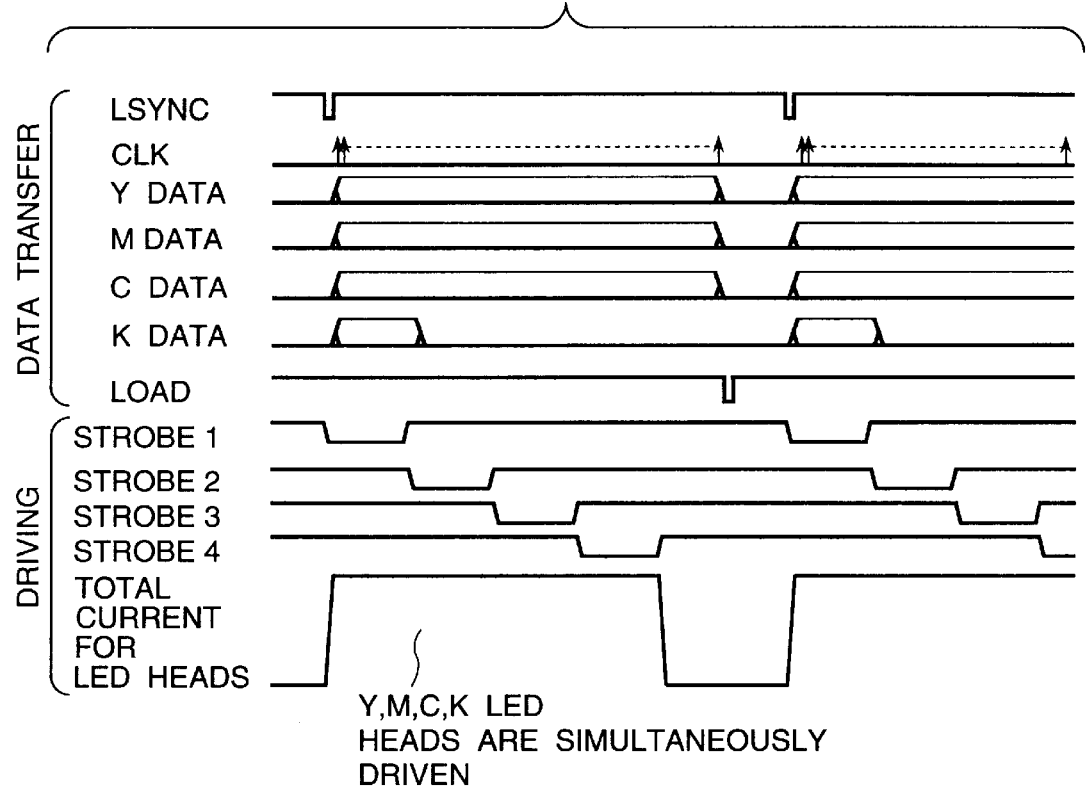
FIGS. 28 and 29 are timing charts illustrating the signals when the LED is driven, FIG. 28 illustrating signals in the color printing and FIG. 29 illustrating signals in the monochrome printing.
Figure 29:
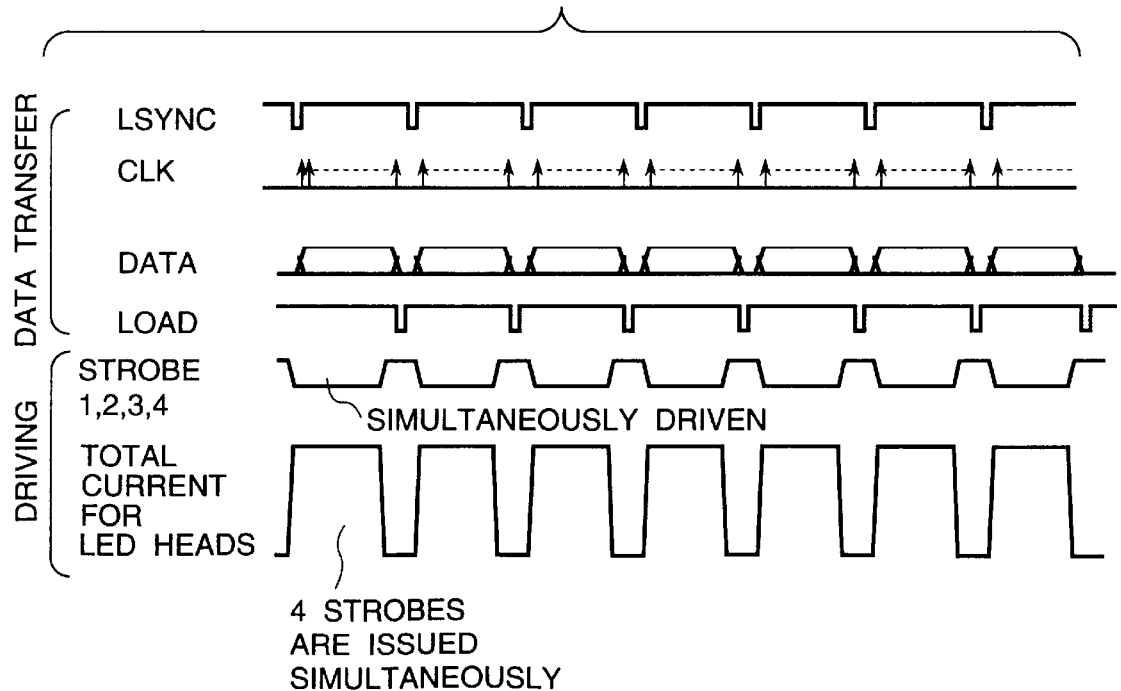

FIGS. 28 and 29 are timing charts illustrating the signals when the LED is driven. FIG. 28 illustrates signals in the color printing and FIG. 29 illustrates signals in the monochrome printing.

In the color printing, the buffers 211–213 direct the yellow, magenta, and cyan image data outputted from the print controlling circuit 288, to the LED heads 203Y, 203M, and 203C, respectively.

The selector 216 selects the A-input when the selector signal 215 is of a low level. Thus, the four bits of black image data held on the 4-bit shift register 214 are transferred through the selector 216 to the LED head 203K. The black image data is transferred from the print controlling circuit 288 to the 4-bit shift register 214 at a speed four times that of image data for the other colors and the four bit parallel data is transferred from the selector 216 to the LED head 203K at the same speed as the image data for the other colors.

The print controlling circuit 288 is connected to the shift register 214 through short wires in the circuit board. Thus, transferring the image data at high speed will not cause significant noise. After the image data has been transferred to the LED head 203K, the operation of the LED head 203K is the same as in the first embodiment.

The monochrome printing will now be described.

The print controlling circuit 288 sets the selector signal 215 to a high level, which in turn disables the buffers 211–213. The selector signal 215 causes the selector 216 to select the B-input so that black image data is transferred over the yellow, magenta, cyan, and black data lines and through the B-input to the LED head 203K. The strobe signals STROBE1 to STROBE4 are simultaneously outputted so that LEDs of the LED head 203K are all driven simultaneously.

As described above, the monochrome printing is performed by using not only a black image data area of the image memory 289 but also image data areas for other colors, and by operating all the circuits in the print controlling circuit 288 just as in the color printing, thereby effecting parallel processing of image data just as in the color printing. In this manner, the signal processing speed in the monochrome printing can easily be increased.

As shown in FIG. 29, the use of a 4-wire LED head for black shortens the time required for transferring image data while still maintaining the same clock frequency for the clock CLK.

The aforementioned second embodiment and the modification thereof offer the same advantages as the first embodiment. Since the clock frequency is not increased, there is no need for using an LED head that is capable of operating at higher clock signals, and there is no chance of interfering radio waves radiating.

Third Embodiment
<Printing gradation data>

Figure 30:
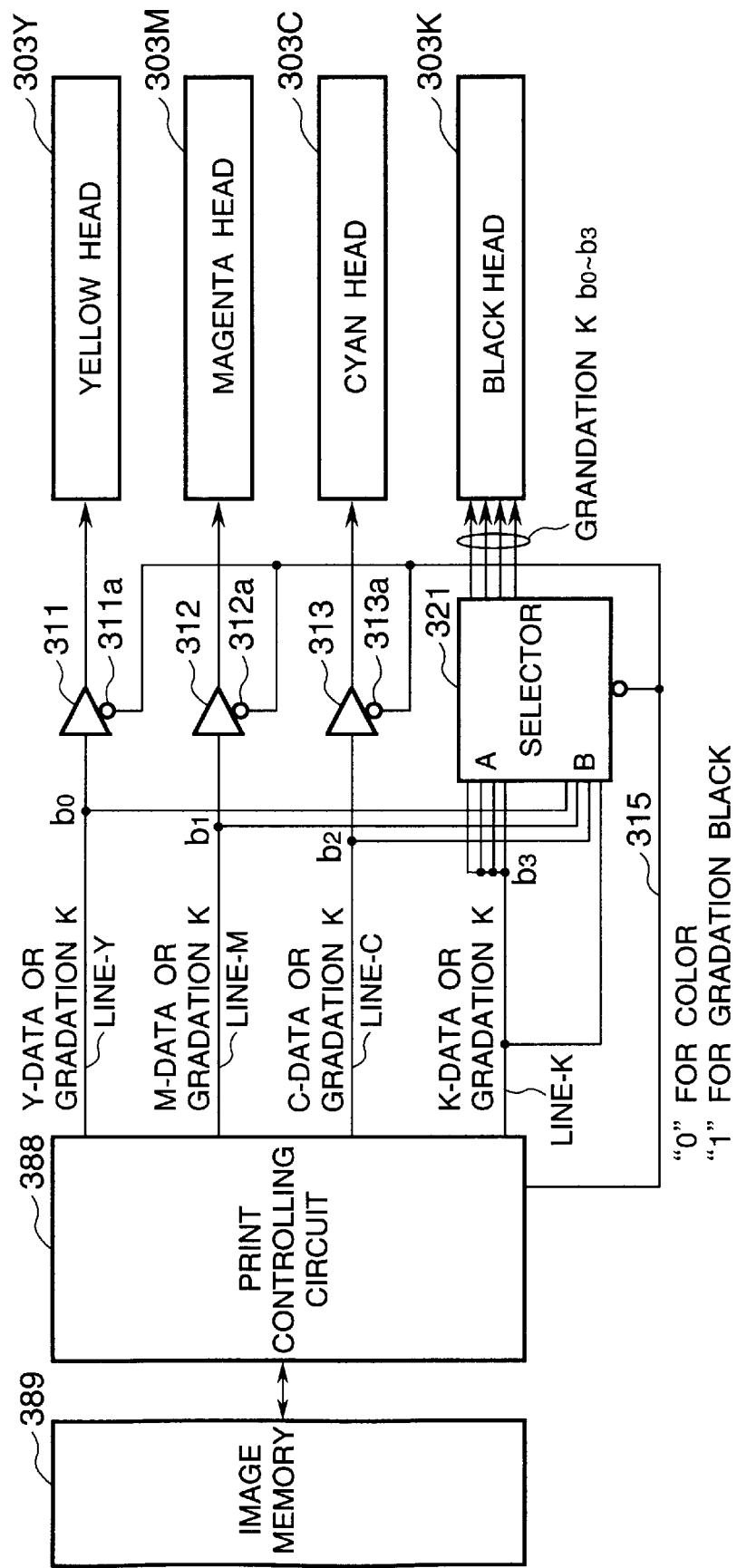
FIG. 30 is a block diagram illustrating a third embodiment.

FIG. 30 is a block diagram illustrating a third embodiment. The third embodiment is characterized in that a black LED head 303K is of an adjustable gradation type where light emission is adjusted in accordance with multi value data.

Referring to FIG. 30, the print controlling circuit 388 provides the selector signal 315 to a selector 321. The print controlling circuit 388 is connected to the buffers 311–313 and selector 321 via data lines LINE-Y, LINE-M, LINE-C, and LINE-K for yellow, magenta, cyan, and black image data, respectively. The buffers 311–313 have output enabling terminals 311a–313a. The data lines LINE-Y, LINE-M, and LINE-C for yellow, magenta, and cyan image data respectively, are connected to corresponding terminals of the B-input of the selector 321 while the data line LINE-K for black image data is connected to four terminals of the input A. The outputs of the buffers 311–313 are connected to yellow LED head 303Y, magenta LED head 303M, cyan LED head 303C, respectively. The buffers 311–313 are controlled to be "valid" or "invalid" in accordance with the selector signal 315 issued from the print controlling circuit 388. When the selector 321 is shifted to the B input, the selector 321 transmits 4-bit gradation data D0–D3 to black LED head 303K.

The operation of the third embodiment will be described.

In the color printing, the print controlling circuit 388 sets the selector signal 315 to a logic "0" which causes the buffers 311–313 to output yellow, magenta, and cyan image data to the LED head 303Y, LED head 303M, and LED head 303C, respectively.

The print controlling circuit 388 outputs one bit of image data for each black dot and the one bit of image data is input into the four terminals of the A-input. Thus, the 4-bit data input into the A-input is "0" or "15" in value. Since the selector signal 315 selects the A-input, the 4-bit gradation data of "0" or "15" is outputted to the LED head 303K. In other words, the value of black image data inputted to the LED head 303K is "0" or "15" in the color printing.

In the monochrome printing, the print controlling circuit 388 sets the selector signal 315 to a logic "1" which causes the outputs of the buffers 311–313 to be shut off and causes the selector 321 to select the B-input. The print controlling circuit 388 provides 4-bit gradation data over the data lines LINE-Y, LINE-M, LINE-C, and LINE-K for yellow, magenta, cyan, and black image data to the selector 321. The least significant bit b0 is output to LINE-Y, and the most significant bit b3 is output to LINE-K.

In the monochrome printing, storage areas in the image memory 389 for other colors than black are used so that each storage area stores one bit of information of 4-bit gradation data. The image data is processed in parallel in the print controlling circuit 388 just as in the color printing, so that the image data is processed at a higher speed in the monochrome printing than in the color printing.

The data transferring operation is the same as the timing chart illustrated in FIG. 7 except that the black image data is 4-bit parallel data. The strobe signals STROBE1 to STROBE4 are simultaneously outputted.

Fourth Embodiment
<Printing black image with lowered resolution>

In general, a decrease in resolution causes a prominent decrease in image quality in color print. For this reason, a high resolution such as 600 dpi is required in the color printing. In the monochrome printing, images often include only characters. A relatively low resolution still maintains print quality in character-only images.

For example, for character-only images, resolutions in the range from 150 dpi to 300 dpi are sufficient in many cases. Thus, in the fourth embodiment, resolution is decreased in order to increase printing speed in the monochrome printing.

Hardware for signal processing in such a low-resolution printing may be those shown FIGS. 24–26. The compressing circuits and expanding circuits perform the following operations so as to reduce the amount of data to be processed in the monochrome printing and increase printing speed.

Figure 31:
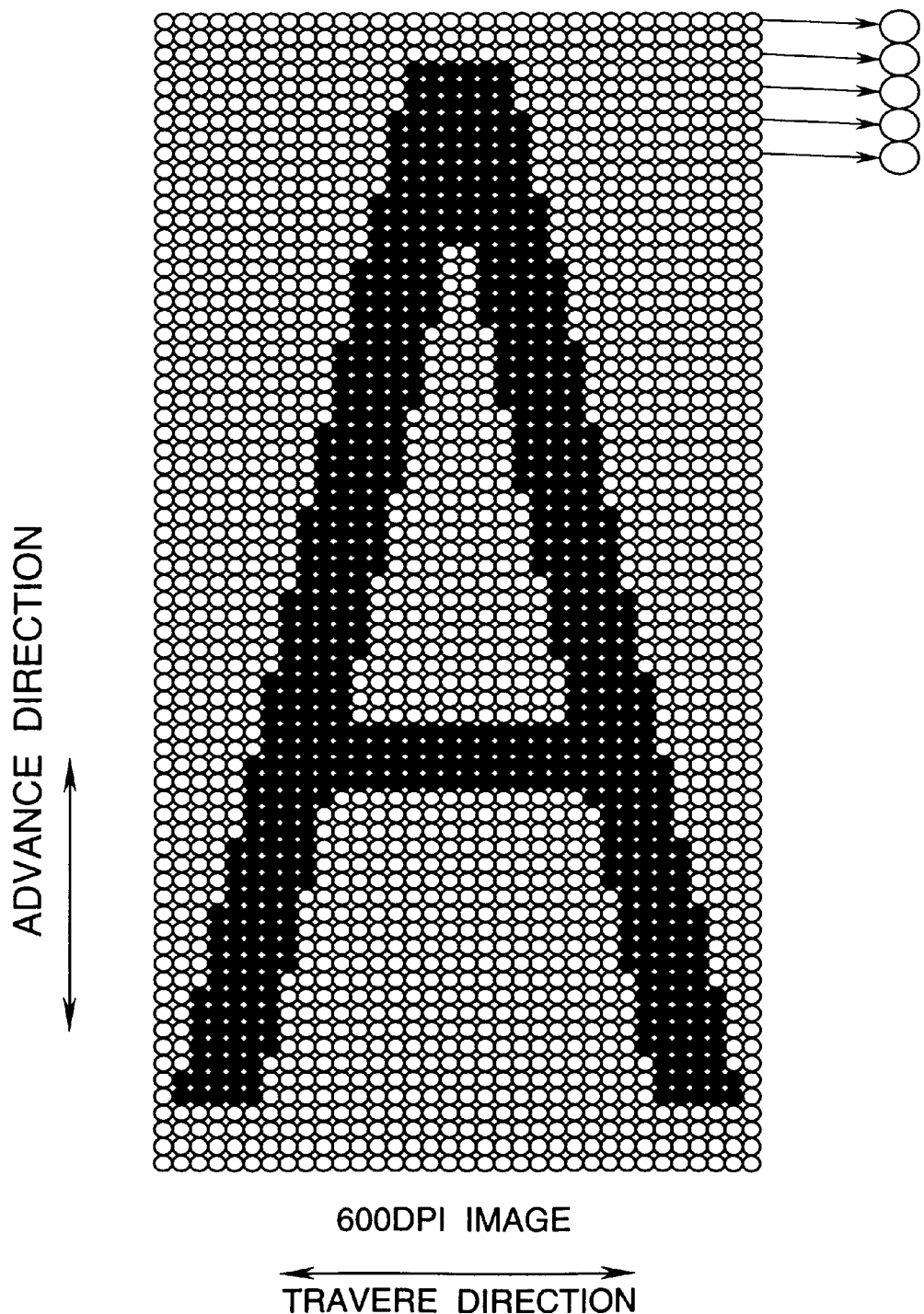
FIG. 31 illustrates an image having a resolution of 600 dpi described in a fourth embodiment.

FIG. 31 illustrates an image having a resolution of 600 dpi.

FIG. 31 shows an arrangement of pixels to print a character "A" at a resolution of 600 dpi. In other words, there are 600 dots per inch. For example, the compressing circuit 254K shown in FIG. 30 compresses the data (FIG. 31) stored in the buffer 253K by a factor of 2 both in the traverse direction and in the advance direction. In other words, logical sums of two adjacent dots are taken in the traverse direction, and every other line is deleted in the advance direction. Then, the data whose resolution is decreased is subjected to the ordinary compression and subsequently stored into the raster buffer 252K.

Figure 32:
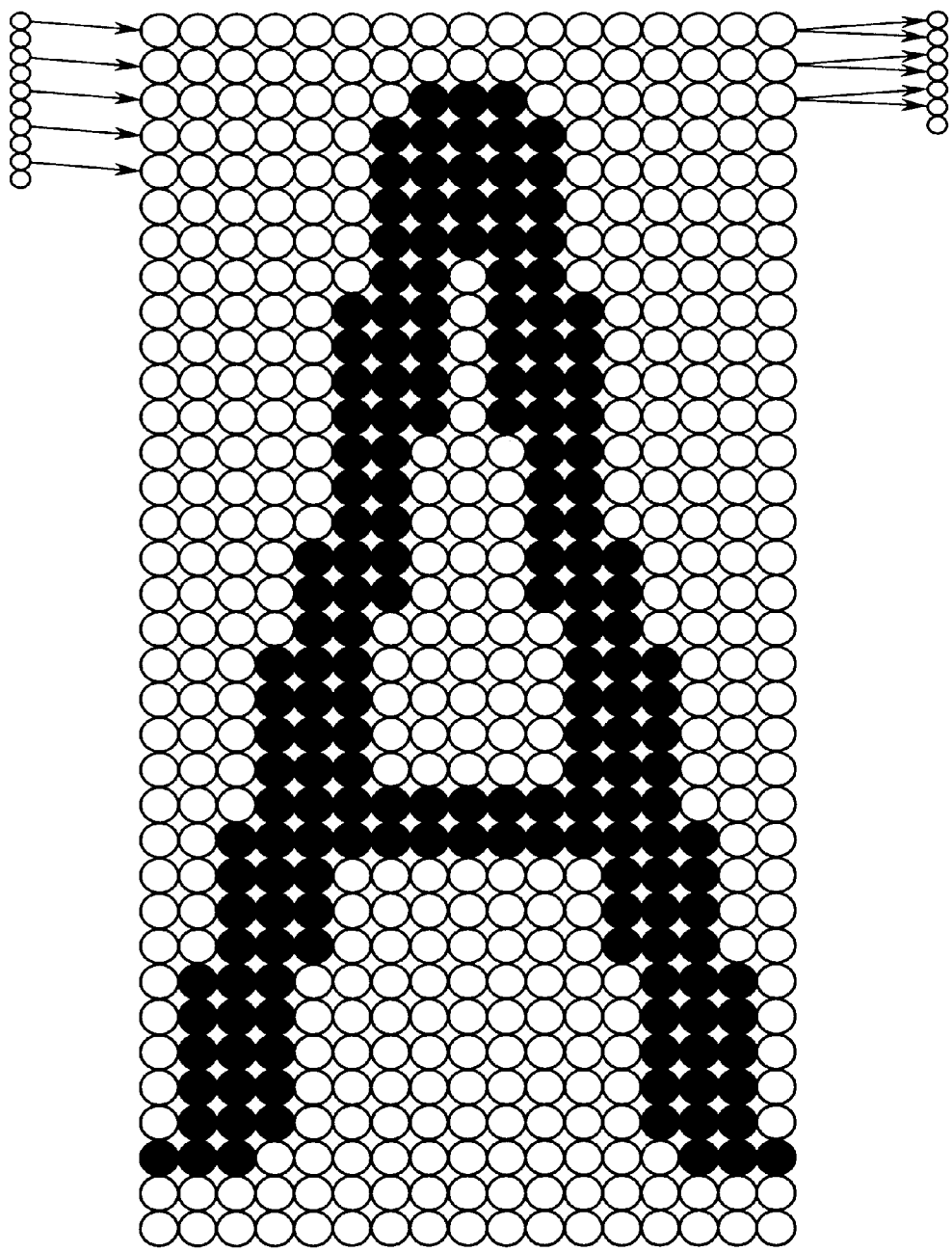
FIG. 32 illustrates an image of a resolution of 300 dpi obtained by the aforementioned operation.

FIG. 32 illustrates an image of a resolution of 300 dpi obtained by the aforementioned operation. The number of pixels of the image shown in FIG. 32 is ¼ of that of the image of 600 dpi. Thus, the compression and expansion can be carried out at a speed four times that of the image of 600 dpi. The printing mechanism 258K is designed for 600 dpi, and therefore, the expanding circuit 256K expands the data, stored in the raster buffer 255K, in the usual method, thereby restoring a resolution of 600 dpi. The image data with restored resolution is stored into the video buffer 257K.

Figure 33:
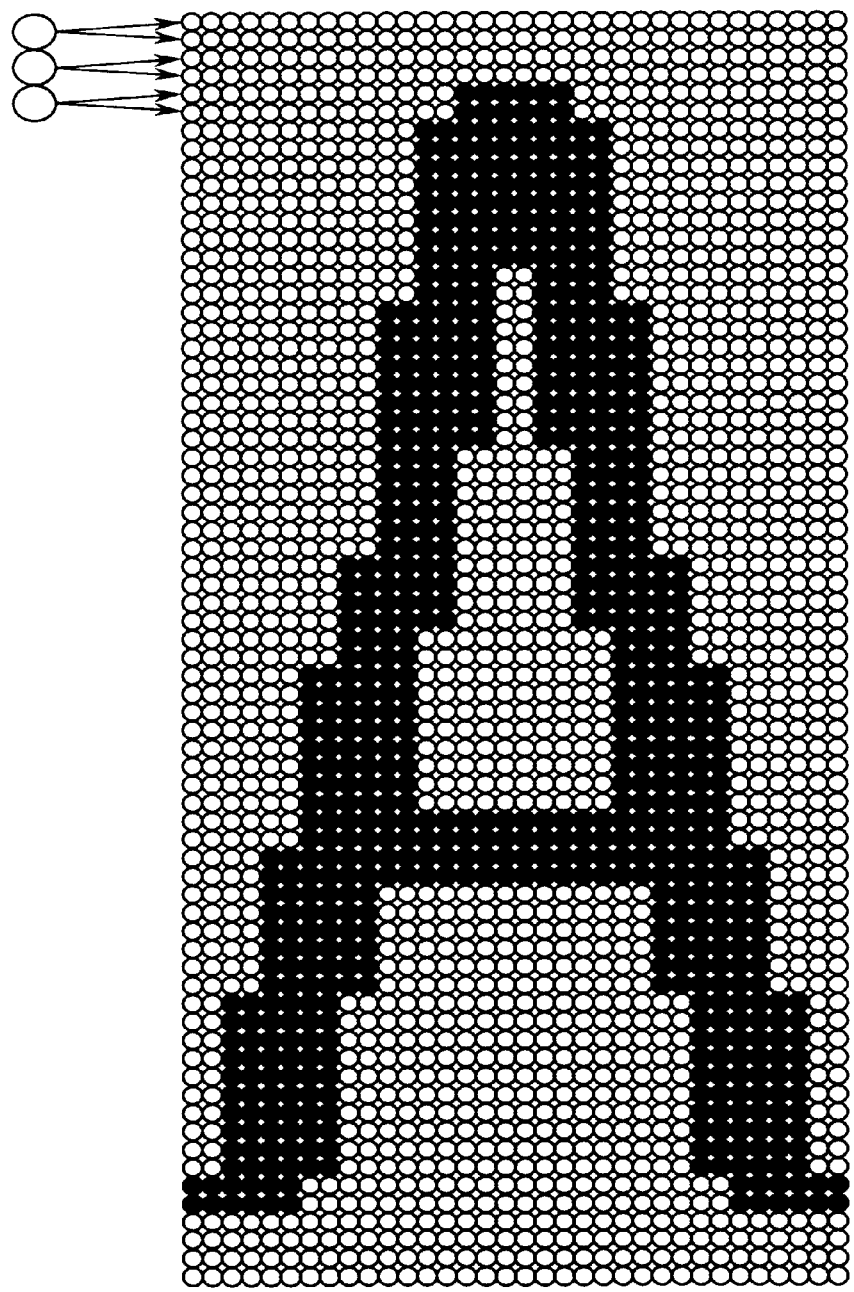
FIG. 33 illustrates the restored image with 600 dpi.

FIG. 33 illustrates the restored image with 600 dpi. As shown in FIG. 33, the same bit of the data of 300 dpi is outputted twice in the traverse direction and the same line of the data is outputted twice in the advance direction. As is clear from FIGS. 31 and 33, images such as characters can be restored with a sufficient print quality in the monochrome printing.

By carrying out the aforementioned signal processing, signal-processing speed can be increased when the image is reduced in resolution and then restored in resolution, thereby achieving a high-speed printing. Such a restoration of data can be effected immediately before the printing mechanism operates to print. Thus, the print engine may have a data-restoring function. This decreases the amount of data to be processed, thereby allowing the data to be transferred from the controller to the print engine.

Fifth Embodiment

<High speed conversion from RGB data to YMCK data>

This embodiment is directed to the process processing for converting the RGB signal into YMCK signals.

Figures 34, 35A, 35B:
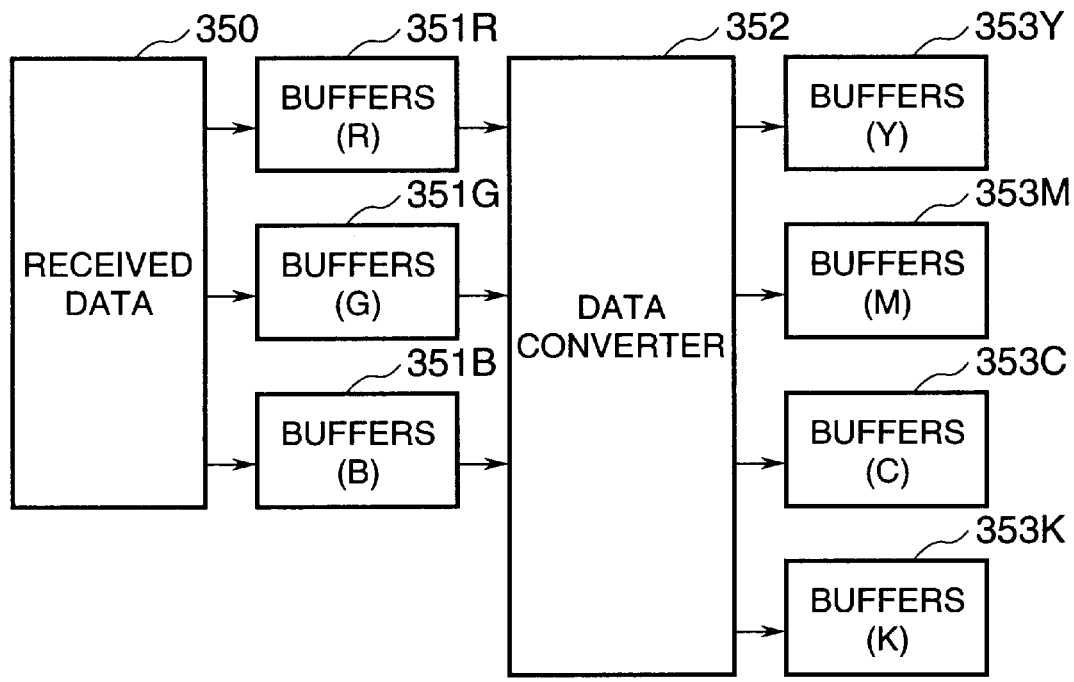
FIG. 34 is a block diagram showing the structure of a data converting section according to a fifth embodiment.
FIG. 35A lists the values of the optical color data for R, G.
FIG. 35B lists the values of the print colors Y,M,C, and K in the monochrome printing.

FIG. 34 is a block diagram showing the structure of a data converting section where optical color data is converted into print color data.

Received data 350 is optical color data including red, green, and blue data, which are received into buffers 351R, 351G, and 351B, respectively. A data converter 352 converts the optical color data into print color data by. Buffers 353Y, 353M, 353C, and 353K store print data, i.e., yellow (Y), magenta (M), cyan (C), and black (K) image data, respectively.

The data converter 352 takes the form of software and performs sophisticated data conversion of the red, green, and blue data. The data conversion is time consuming and is an obstacle to high-speed printing. In the embodiment, this data conversion is simplified to achieve high-speed monochrome printing.

FIG. 35A lists the values of the optical color data R, G, and B in the monochrome printing.

FIG. 35B lists the values of the print colors Y,M,C, and K corresponding to the optical color data RGB of FIG. 35A.

The data is expressed in hexadecimal. Thus, the data can have 256 different values, from "00" to "FF." The value "00" indicates a density of 0% and the value "FF" represents a density of 100%.

The red (R), green (G), and blue (G) are three primary colors of light while yellow, magenta, cyan ,and black are three print colors. The former is additive and the latter is subtractive. Thus, if all of R, G, and B have a density of 100%, then the resultant printed color is white, i.e., all of Y, M, C, and K have a density of 0%. If all of R, G, and B have a density of 0%, then the resultant printed color is black, i.e., all of Y, M, and C have a density of 0% and black has a value of "FF." Using this characteristic, data conversion can be simplified in the monochrome printing.

Figure 36:
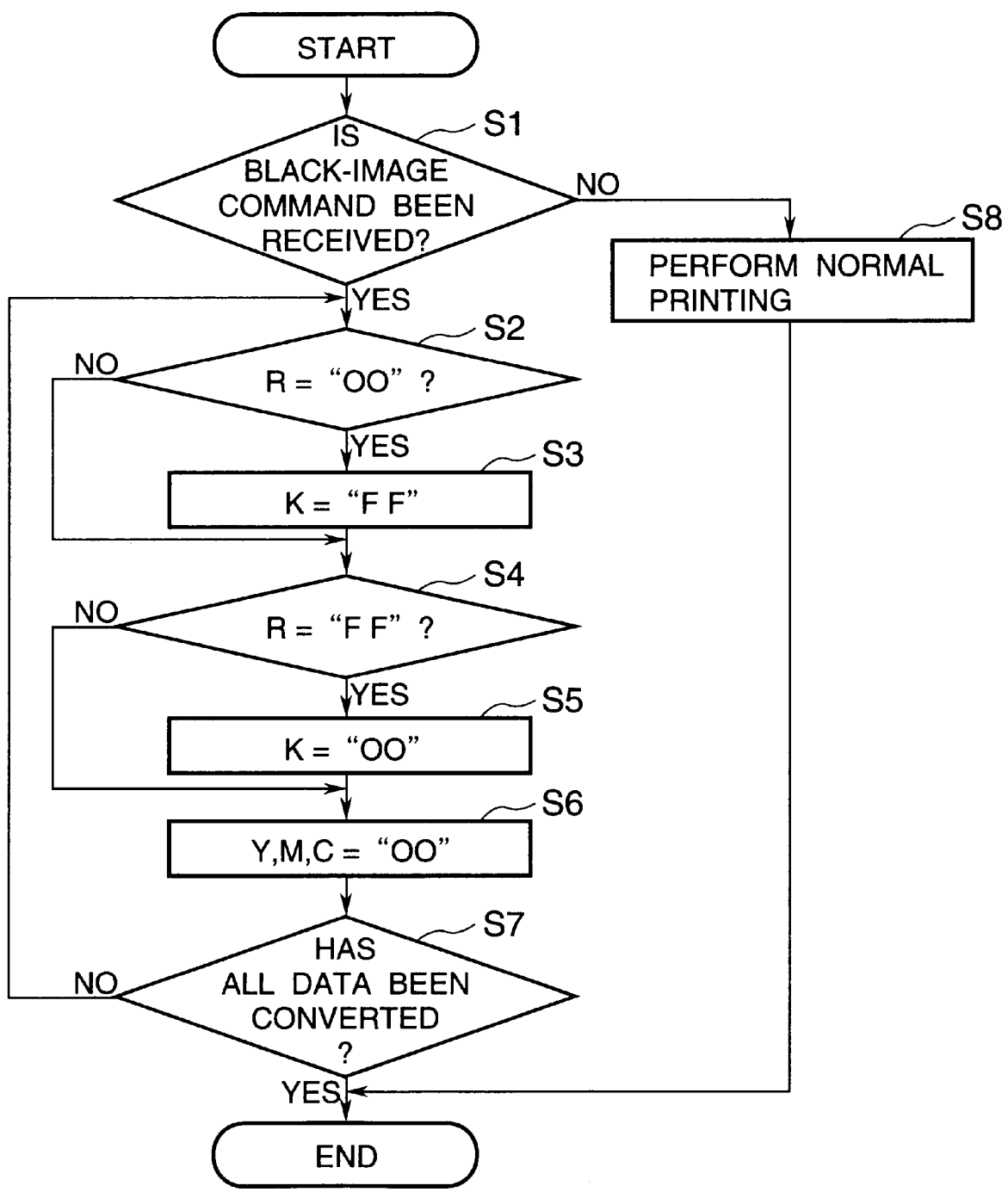
FIG. 36 is a flowchart illustrating the data conversion.

FIG. 36 is a flowchart illustrating the data conversion. Prior to the monochrome printing, a host apparatus transmits a black-image command indicative of a black image.

At step S1, a check is made to determine whether the image recording apparatus has received print data together with the black-image command. If the answer at step S1 is NO, then the program proceeds to step S8 where a normal data conversion is performed for the color printing. If the answer is YES at step S1, then the data converter 352 performs steps S2–S6.

At step S2, a color component R is checked. If R is "00", then color component K is set to "FF" at step S3. Since the monochrome printing has been specified, any data in the monochrome printing should describe either black or white. Thus, if the component R is found to be "00", then green and blue need not be checked.

If the component R is found to be "FF", the print color will be white. Thus, the program proceeds to step S4 and then to S5 where the color component K is set to "00." Since the monochrome printing has been specified, the data should describe either black or white. Thus, if the component R is found to be "FF", then green and blue need not be checked. The values for Y, M, C, and K are all assigned "00" at step S6. Although step S6 is carried out on a data-by-data basis, the step S6 may be carried out at a time on the entire print data of a document to be printed.

A check is made at step S7 to determine whether all the RGB data has been converted into YMCK data. If the answer is NO, the program jumps back to step S2 where data conversion begins for the next data.

As mentioned above, if the image recording apparatus is informed that the data is only for monochrome printing only, printing, then data conversion is very much simplified, increasing overall printing speed in the monochrome printing.

As shown in FIG. 34, the data for three colors received from a host apparatus is stored into the buffers 351R, 351G, and 351B, respectively. In the monochrome printing, only the component R is checked. Thus, the data for green and blue need not be stored. The present embodiment is directed to an effective use of the buffers 351R, 351G, and 351B.

Figure 37:
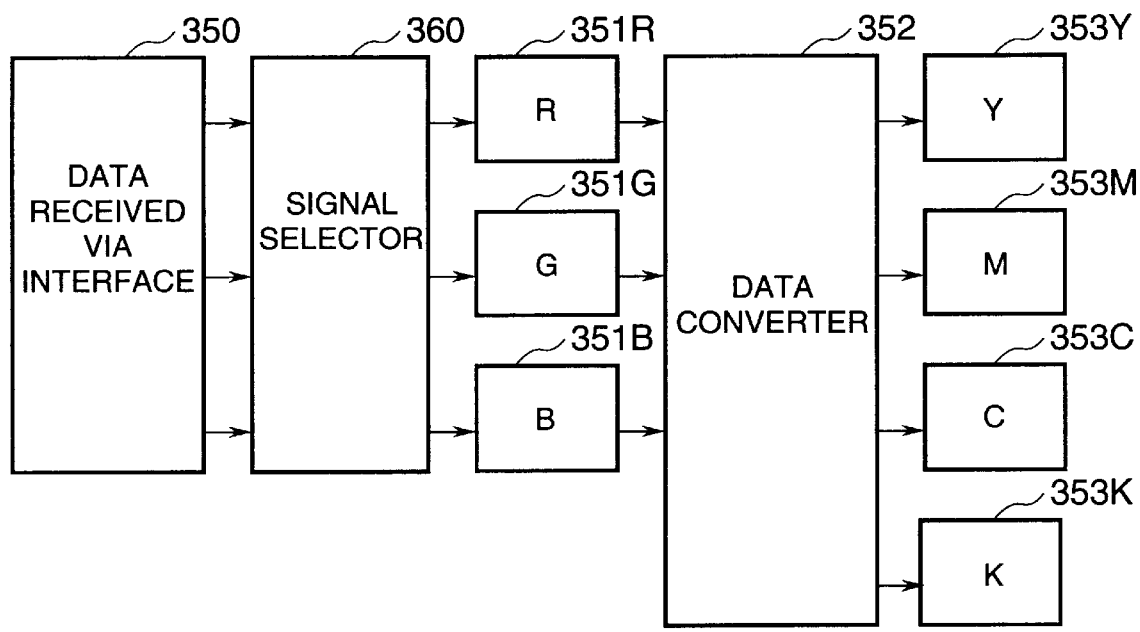
FIG. 37 is a block diagram showing the structure of a data converting section where optical color data is converted into print color data.

FIG. 37 is a block diagram showing the structure of a data converting section where optical color data is converted into print color data. The data converting section of FIG. 37 differs from that of FIG. 34 in that a signal selector 360 that receives data 350 from the host apparatus prior to the printing operation. The signal selector 360 receives only color component R from the data received from the host apparatus. The received component R is divided and stored into buffers 351R, 351G, and 351B in this order.

The data converter 352 reads the data for R from the buffers 351R, 351G, and 351B in this order and performs data conversion of the data read out of these buffers.

As described above, the buffers 351R, 351G, and 351B are effectively used in the monochrome printing. The apparent capacity of buffers as a whole becomes large, achieving high-speed reception of print data and therefore increasing overall printing speed in the monochrome printing.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

We claim:

1. A color image recording apparatus, comprising:

a set of color print heads driven in accordance with corresponding color image data;

a monochrome print head driven in accordance with black image data;

a controller, transmitting the color image data to corresponding color print heads and the black image data to the monochrome print head;

wherein said controller transmits in parallel or in serial the color image data and the black image data to the corresponding print heads in a color printing mode, said controller transmitting the color image data and black image data at a first transfer speed in the color printing mode and the black image data at a second transfer speed in the monochrome printing mode.

2. The image recording apparatus according to claim 1, wherein the second transfer speed is higher than the first transfer speed.

3. The image recording apparatus according to claim 2, wherein the second transfer speed is four times the first transfer speed.

4. The image recording apparatus according to claim 1, wherein the second transfer speed is lower than the first transfer speed.

5. The image recording apparatus according to claim 4, wherein the second transfer speed is a quarter of the first transfer speed.

6. The image recording apparatus according to claim 5, wherein the monochrome print head and color print heads are LED heads, the monochrome print head emits light having higher light emission than the color print heads, wherein in the color printing, the color print heads are driven for a first length of time and the monochrome print head is driven for a second length of time which is a quarter of the first length of time;

wherein in the monochrome printing, the monochrome print head is driven for the second length of time.

7. An image recording apparatus, comprising:

a set of color print heads driven in accordance with corresponding color image data;

a monochrome print head driven in accordance with black image data;

a controller, transmitting the color image data to corresponding color print heads and the black image data to the monochrome print head, said controller transmitting the color image data and black image data at predetermined transfer speeds, said controller having signal processing circuits corresponding to the color print heads and the monochrome print head;

wherein in a color printing mode, the signal processing circuits process the color image data and black image data and then transmit processed color image data and black image data to the corresponding print heads;

wherein in a monochrome printing mode, said controller divides the black image data into a plurality of segments and supplies the segments in parallel to the signal processing circuits, the signal processing circuits process the segments and supply the processed data to the monochrome print head in a predetermined sequence.

8. The image recording apparatus according to claim 7, wherein said controller receives the color image data and black image data from a host apparatus;

wherein the signal processing circuits include compressing circuits that compress the color image data and black image data received from a host apparatus, expanding circuits that expand the color image data and black image data compressed by the compressing circuits, and buffer circuits that store the color image data and black image data;

wherein said controller supplies the expanded color image data and black image data from the buffer circuits to the print heads.

9. The image recording apparatus according to claim 7, wherein the signal processing circuits include:

buffers that store optical image signals including red image data, green image data, and blue image data;

a data converter that converts the optical image signals into the color image data including yellow image data, magenta image data, and cyan image data, and black image data;

wherein in the monochrome printing mode, the data converter converts the red image data into a black level if the red image data has a first value, and converts the red image data into a white level if the red image data has a second value.

10. The image recording apparatus according to claim 7, wherein the monochrome print head has four input terminals and receives the black image data at the four input terminals from the signal processing circuits in the monochrome printing mode.

11. The image recording apparatus according to claim 10, wherein the black image data is multi-value data indicative of gradation of the black image.

12. A color image recording apparatus having a plurality of image forming sections each of which prints an image of a corresponding color to a print medium passing when the print medium passes therethrough, images of respective colors being printed in registration on one another, the apparatus comprising:

a set of print heads driven in accordance with print data for corresponding colors;

a controller, transmitting the print data to the corresponding print heads;

wherein said controller transmits the print data to the corresponding print heads at a first transfer speed when a printing is performed for at least two colors, and at a second transfer speed when the printing is performed for a single color.

13. The color image recording apparatus according to claim 12, wherein the printing is performed at a higher speed when the printing is performed for a single color than when the printing is performed for at least two colors.

* * * * *